US012027461B2

(12) United States Patent
Chen et al.

(10) Patent No.: US 12,027,461 B2
(45) Date of Patent: Jul. 2, 2024

(54) SEMICONDUCTOR DEVICE INCLUDING BURIED CONDUCTIVE FINGERS AND METHOD OF MAKING THE SAME

(71) Applicant: TAIWAN SEMICONDUCTOR MANUFACTURING COMPANY, LTD., Hsinchu (TW)

(72) Inventors: Chih-Liang Chen, Hsinchu (TW); Guo-Huei Wu, Hsinchu (TW); Li-Chun Tien, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 453 days.

(21) Appl. No.: 17/108,752

(22) Filed: Dec. 1, 2020

(65) Prior Publication Data

US 2021/0358847 A1    Nov. 18, 2021

Related U.S. Application Data

(60) Provisional application No. 63/024,203, filed on May 13, 2020.

(51) Int. Cl.
*H01L 23/528* (2006.01)
*G06F 30/392* (2020.01)
(Continued)

(52) U.S. Cl.
CPC ........ *H01L 23/5286* (2013.01); *G06F 30/392* (2020.01); *G06F 30/3953* (2020.01); *G06F 2119/06* (2020.01)

(58) Field of Classification Search
CPC ............... H01L 23/5286; G06F 30/392; G06F 30/3953; G06F 2119/06
(Continued)

(56) References Cited

U.S. PATENT DOCUMENTS 6,159,841 A    12/2000   Williams et al.
6,385,430 B1 *  5/2002   Jackson ............. H04N 1/00681
                                              250/208.6
(Continued)

FOREIGN PATENT DOCUMENTS

DE         69533691       2/2006
DE      112016007503      2/2020
(Continued)

OTHER PUBLICATIONS

Office Action dated Jul. 28, 2022 for corresponding case No. KR 10-2021-0012545. (pp. 1-3) English translation attached on p. 1.
(Continued)

*Primary Examiner* — Hrayr A Sayadian
(74) *Attorney, Agent, or Firm* — Hauptman Ham, LLP

(57) ABSTRACT

A semiconductor device, includes a semiconductor substrate with active regions and a first buried metal layer provided below the semiconductor substrate. The first buried metal layer includes a first buried conductive rail, a first set of buried conductive fingers that extends from the first buried conductive rail, and a second set of buried conductive fingers that are interleaved with the first set of buried conductive fingers. The first set and the second set of buried conductive fingers extends beneath more than one of the active regions. In this manner, the first set and the second set of buried conductive fingers can be utilized to distribute different voltages, such as a ungated reference voltage TVDD and a gated reference voltage VVDD in a header circuit with reduced resistance.

20 Claims, 13 Drawing Sheets

(51) Int. Cl.
  *G06F 30/3953* (2020.01)
  *G06F 119/06* (2020.01)
(58) Field of Classification Search
  USPC .......................................................... 257/734
  See application file for complete search history.

(56) References Cited

U.S. PATENT DOCUMENTS

| | | | |
|---|---|---|---|
| 7,260,442 | B2 | 8/2007 | Hwang et al. |
| 8,674,440 | B2 | 3/2014 | Korec et al. |
| 9,256,709 | B2 | 2/2016 | Yu et al. |
| 9,923,073 | B2 | 3/2018 | Nakano et al. |
| 2008/0150082 | A1 | 6/2008 | Zupac et al. |
| 2009/0152649 | A1 | 6/2009 | Kim |
| 2012/0126406 | A1 | 5/2012 | Dix |
| 2013/0321100 | A1* | 12/2013 | Wang ................. H03H 9/54 333/187 |
| 2014/0040838 | A1 | 2/2014 | Liu et al. |
| 2015/0041917 | A1* | 2/2015 | Zhu ................. H01L 29/42372 257/392 |
| 2015/0278429 | A1 | 10/2015 | Chang |
| 2016/0225709 | A1 | 8/2016 | Roy et al. |
| 2017/0090622 | A1* | 3/2017 | Badaye ................. G06F 3/0448 |
| 2020/0019671 | A1 | 1/2020 | Lin et al. |
| 2020/0027849 | A1 | 1/2020 | Trang et al. |

FOREIGN PATENT DOCUMENTS

| | | |
|---|---|---|
| KR | 20090064747 | 6/2009 |
| KR | 20200008529 | 1/2020 |
| KR | 20200011035 | 1/2020 |
| WO | 2018237106 | 12/2018 |

OTHER PUBLICATIONS

Nathan, Arokia, et al. "Flexible electronics: the next ubiquitous platform." Proceedings of the IEEE 100.Special Centennial Issue (2012): 1486-1517.

Office Action dated Jan. 18, 2022 for corresponding case No. TW 11120063850. (pp. 1-4).

Office Action dated Jan. 21, 2022 for corresponding case No. DE 10 2020 132 602.5 (pp. 1-12).

Office Action dated Dec. 29, 2021 for corresponding case No. 10-2021-0012545. (pp. 1-4).

* cited by examiner

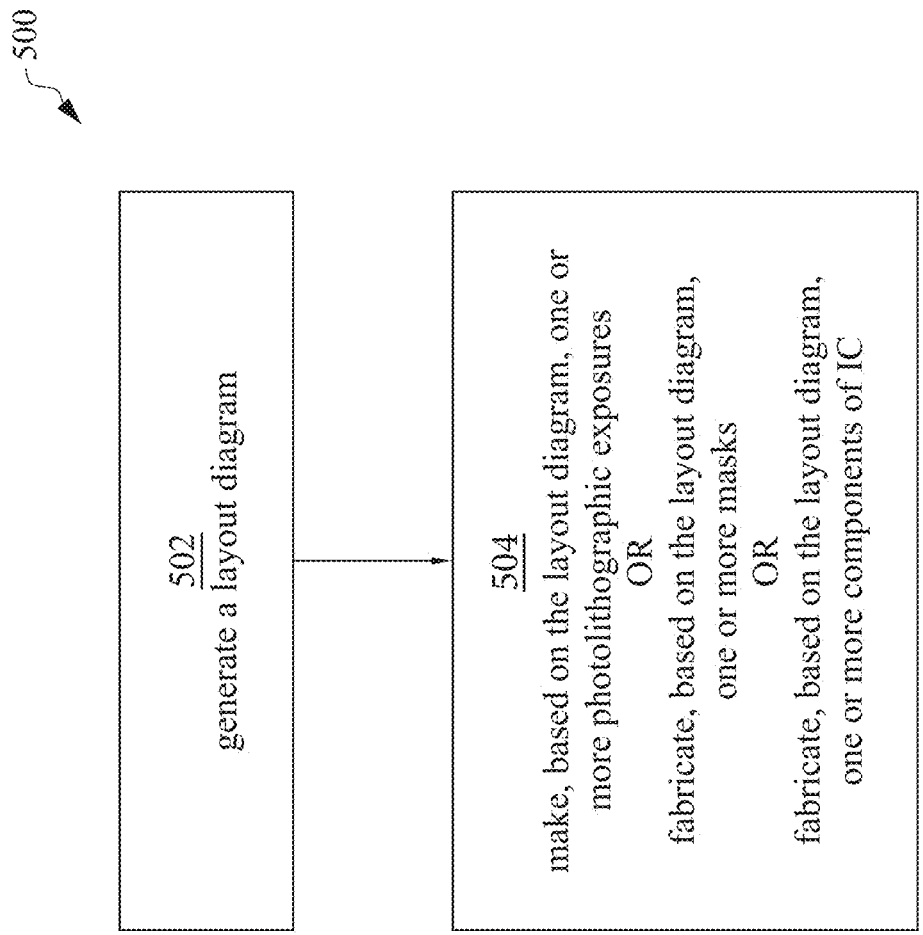

SEMICONDUCTOR DEVICE INCLUDING BURIED CONDUCTIVE FINGERS AND METHOD OF MAKING THE SAME

PRIORITY CLAIM

The instant application is a is a non-provisional application claiming priority to Provisional Application No. 63/024,203, filed May 13, 2020, the entire contents of which are incorporated by reference herein.

BACKGROUND

The semiconductor integrated circuit (IC) industry has produced a wide variety of analog and digital devices to address issues in a number of different areas. As ICs have become smaller and more complex, operating voltages of these analog and digital devices are reduced affecting the operating voltages of these digital devices and overall IC performance. Furthermore, power consumption in these analog and digital devices can increase due to leakage currents. Header circuits use power gating to turning off power supplied to circuits within the IC not being used. Reducing the resistance of header circuits has a benefit of reducing the overall power consumption of the IC.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 5 is a flowchart of a method, in accordance with some embodiments.

DETAILED DESCRIPTION

Figure 1:
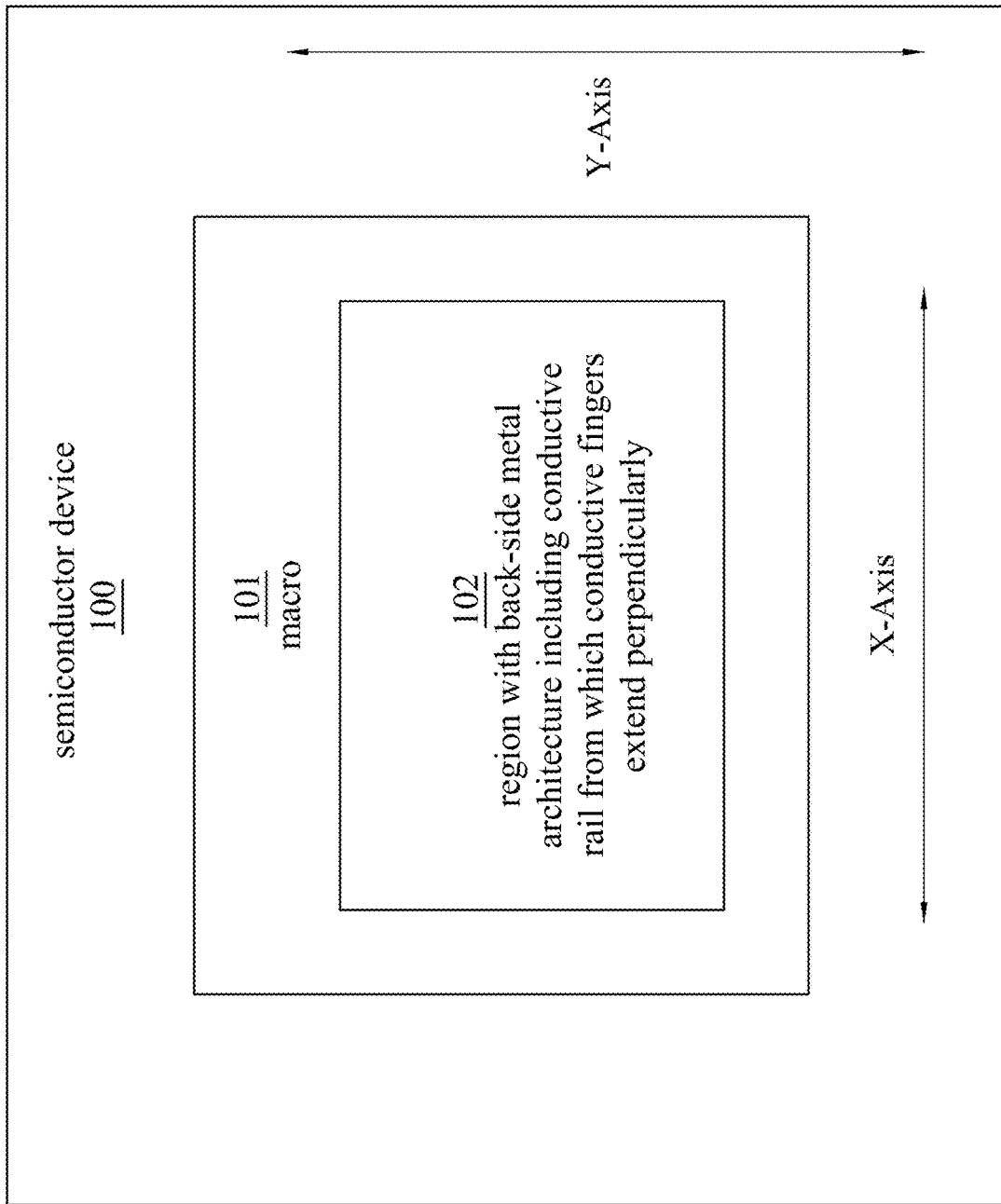
FIG. 1 is a block diagram of a semiconductor device, in accordance with some embodiments of the present disclosure.

The following disclosure provides different embodiments, or examples, for implementing features of the provided subject matter. Specific examples of components, materials, values, steps, arrangements, or the like, are described below to simplify the present disclosure. These are, of course, merely examples and are not limiting. Other components, materials, values, steps, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some embodiments, a semiconductor device includes a semiconductor substrate including active regions, each active region having a long axis extending in a first direction. A first buried metal layer is below the semiconductor substrate. The first buried metal layer includes a first buried conductive rail having a long axis extending in the first direction. In some embodiments, the first buried conductive rail is configured to transmit a first reference voltage (e.g., a gated version of VDD referred to herein as VVDD). Furthermore, in some embodiments the semiconductor device includes a first set of buried conductive fingers, each of which extends from the first buried conductive rail and each of which has a long axis extending in a second direction that is substantially orthogonal to the first direction. Each buried conductive finger in the first set extends beneath more than one of the active regions. In this manner, VVDD is provided to appropriate locations/portions of corresponding ones of active regions. The first buried metal layer also includes a second set of buried conductive fingers. Each buried conductive finger in the second set has a long axis extending in the second direction and extending beneath more than one of the active regions. The second set of buried conductive fingers is interleaved with the first set of buried conductive fingers. In some embodiments, the second set of buried conductive fingers is used to distribute a second reference voltage (e.g., an ungated version of VVDD referred to herein as TVDD) to appropriate locations/portions of corresponding ones of active regions. According to another approach, a first buried metal layer is provided that includes only buried conductive rails, each of which has a long axis that extends in the first direction, and where the other approach does not include fingers extending in the second direction from the conductive rails. By using buried conductive fingers extending in the second direction in accordance with some embodiments, more locations/portions of corresponding ones of active regions are available for connection/coupling correspondingly to VVDD or TVDD as compared to the other approach. As such, using buried conductive fingers extending in the second direction in accordance with some embodiments makes it easier to distribute VVDD and/or TVDD throughout the semiconductor device, and in particular throughout a header circuit, because the increased number of locations/portions of corresponding ones of active regions are available for connection/coupling correspondingly to VVDD or TVDD reduces corresponding resistive loads.

FIG. 1 is a block diagram of a semiconductor device 100 in accordance with an embodiment of the present disclosure.

In FIG. 1, semiconductor device 100 includes, among other things, a circuit macro (hereinafter, macro) 101. In some embodiments, macro 101 is a header circuit. In some embodiments, macro 101 is a macro other than a header circuit. Macro 101 includes, among other things, a region 102 with a back-side metal architecture including a conductive rail from which conductive fingers extend substantially perpendicularly. As explained below, the conductive fingers increase the area available for making connections to conductive segments which provide different voltages in a power-gating scheme. The region 102 includes metal layers and interconnection layers (the latter including via structures) beneath the semiconductor substrate (where "beneath" is relative to the Z-direction-not shown in FIG. 1), also referred to as "buried" metal layers and "buried" vias. In some embodiments, the region 102 has conductive fingers buried beneath the semiconductor substrate that are utilized to receive different reference voltages (e.g., VVDD, TVDD).

Figure 2A:
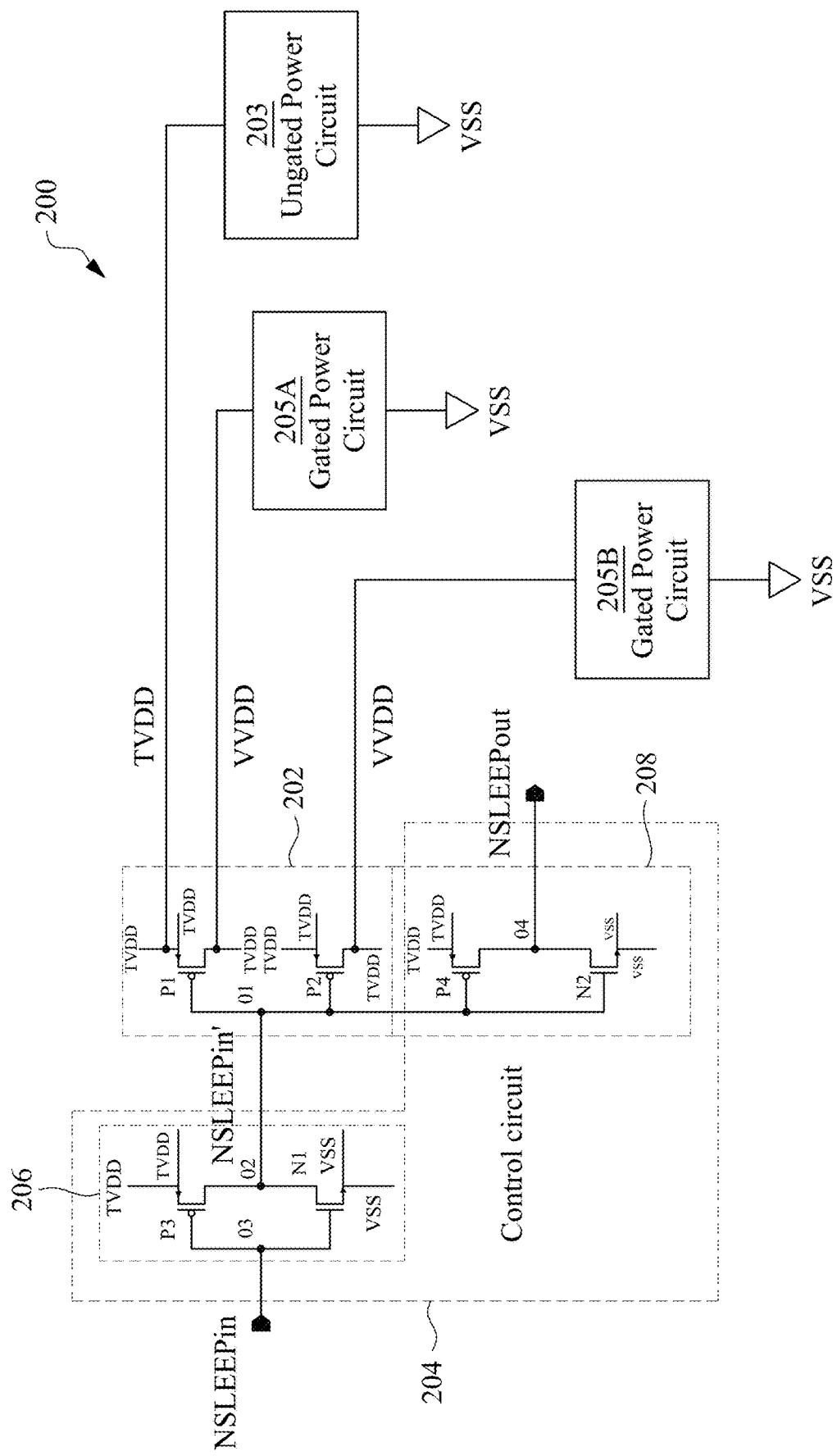
FIG. 2A is a circuit diagram, in accordance with some embodiments.

FIG. 2A is an integrated circuit (IC) circuit 200, in accordance with some embodiments.

IC 200 is an example of a circuit usable in region 102 described above. As such, IC 200 is one example of a circuit that benefits from using a back-side metal architecture (see FIGS. 2A-2E, 3, 4A-4B, or the like) including a conductive rail from which conductive fingers extend substantially perpendicularly.

IC 200 includes: a header circuit 202; an ungated power circuit 203; a gated power circuit 205A; a gated power circuit 205B; and a control circuit 204. In general, power consumption by a circuit increases due to leakage currents. Power gating is a technique to reduce power consumption in circuits within an IC by turning off power supplied to circuits within the IC which are not being used. The power provided to each of gated power circuits 205A & 205B is gated by corresponding portions of header circuit 202, hence each of circuits 205A & 205B is referred to herein as a gated power circuit. The power provided to ungated power circuit 203 is not gated by a corresponding header circuit, hence circuit 203 is referred to herein as an ungated power circuit.

Each of gated power circuits 205A & 205B is a type of circuit which is configured to operate in a normal mode, and in a sleep mode, standby more, or the like. In the normal mode, power is provided to each of gated power circuits 205A & 205B. In the normal mode, each of gated power circuits 205A & 205B is being used by IC 200 and is either active or inactive, with more power being consumed when active than when inactive. Though less power is consumed when each of gated power circuits 205A & 205B is in use albeit inactive, nevertheless significant power is consumed due to leakage currents. In the sleep mode, standby more, or the like, each of gated power circuits 205A & 205B is not being used and so power is temporarily cut off from each of gated power circuits 205A & 205B. Accordingly, in the sleep mode, standby mode, or the like, each of gated power circuits 205A & 205B not only is inactive, but each of circuits 205A & 205B also does not suffer leakage currents. A more detailed description of a header circuit and its relation to a gated power circuit and an ungated power circuit may be found in U.S. Patent Publication No. 20200019671A1, entitled "Integrated Circuit and Method of Forming the Same," which is incorporated herein by reference in its entirety.

Header circuit 202 includes a PMOS transistor P1 and a PMOS transistor P2. A source of PMOS transistor P1 and a source of PMOS transistor P2 are both configured to receive an ungated version of a reference voltage, e.g., VDD. In FIG. 2A, the ungated version of VDD is referred to as true VDD (TVDD). Furthermore, a body contact of PMOS transistor P1 and a body contact of PMOS transistor P2 are configured to receive ungated reference voltage TVDD. When transistors P1 and P2 correspondingly are turned on, a drain of PMOS transistor P1 and a drain of PMOS transistor P2 provide a gated version of TVDD correspondingly to gated power circuits 205A & 205B. The gated version of TVDD is referred to as virtual VDD (VVDD) in FIG. 2A. Assuming that a source-drain voltage drop (Vsd) for each of transistors P1 and P2 is sufficiently small as to be regarded as negligible, VVDD=TVDD−Vsd≈TVDD, and thus VVDD is substantially similar to TVDD. When transistors P1 and P2 correspondingly are turned OFF, power is cut off correspondingly to gated power circuits 205A and 205B.

A gate of PMOS transistor P1 and a gate of PMOS transistor P2 are both connected to a node O1 and are configured to receive a control signal NSLEEPin'. Header circuit 202 is, and more particularly each of transistors P1 and P2 are, configured to be turned on and off based on control signal NSLEEPin'. It should be noted that header circuit 202 may have a different configuration than the embodiment shown in FIG. 2A. For example, in some alternative embodiments, header circuit 202 has a single PMOS transistor, e.g., P1, which provides VVDD to each of gated power circuits 205A & 205B. In such an alternative embodiment in which the current-sourcing capacity of the transistor P1 is sufficient to source each of gated power circuits 205A & 205B, the use of single transistor P1 reduces the area consumed by header circuit 202.

Control circuit 204 includes a first inverter 206 and a second inverter 208. First inverter 206 is configured receive control signal NSLEEPin and to invert the same so as to generate control signal NSLEEPin'. Thus, if control signal NSLEEPin is received in a high voltage state (e.g., at or near TVDD), then first inverter 206 is configured to generate control signal NSLEEPin' at a low voltage state (e.g., at or near VSS). If control signal NSLEEPin is received in a low voltage state (e.g., at or near VSS), then first inverter 206 is configured to generate control signal NSLEEPin' at a low voltage state (e.g., at or near TVDD).

In this embodiment, first inverter 206 includes a PMOS transistor P3 and an NMOS transistor N1. PMOS transistor P3 has a source connected to receive ungated reference voltage TVDD and a drain connected to node O2. A body contact of PMOS transistor P3 is connected to receive ungated reference voltage TVDD. Node O2 is connected to node O1 of circuit 202. NMOS transistor N1 has a drain connected to node O2 and a source connected to receive a reference voltage VSS (e.g., a ground voltage). A body contact of NMOS transistor N1 is connected to receive a reference voltage VBB. A gate contact of PMOS transistor P3 and a gate contact of NMOS transistor N1 are both connected to node O3. Control signal NSLEEPin is received at node O3.

Accordingly, if control signal NSLEEPin is received in a low voltage state (e.g., at or near VSS), PMOS transistor P3 turns on and NMOS transistor N1 shuts off. PMOS transistor P3 thus pulls the voltage at node O2 up at or near TVDD so that control signal NSLEEPin' is provided at or near TVDD. As such, the voltage at node O1 is in the high voltage state at or near TVDD. Accordingly, PMOS transistor P1 and PMOS transistor P2 are shut off and thus power is cut off correspondingly to gated power circuits 205A and 205B.

On the other hand, if control signal NSLEEPin is in a high voltage state (at or near TVDD), PMOS transistor P3 shuts off and NMOS transistor N1 turns on. NMOS transistor N1 thus pulls the voltage at node O2 down at or near VSS so that control signal NSLEEPin' is at or near VSS. As such, node O1 is in the low voltage state at or near VSS. Accordingly, PMOS transistor P1 and PMOS transistor P2 are turned on to provide gated reference voltage VVDD to gated power circuits 205A & 205B.

Second inverter 208 is configured to generate control signal NSLEEPout from control signal NSLEEPin'. More specifically, second inverter 208 is configured to invert control signal NSLEEPin' and generate control signal NSLEEPout. Thus, if control signal NSLEEPin' is received in a high voltage state (e.g., at or near TVDD) second inverter 208 is configured to generate control signal NSLEEPout at a low voltage state (e.g., at or near VSS). If control signal NSLEEPin' is received in a low voltage state (e.g., at or near VSS), second inverter 208 is configured to generate control signal NSLEEPout at a high voltage state (e.g., at or near TVDD).

In this embodiment, second inverter 208 includes a PMOS transistor P4 and an NMOS transistor N2. PMOS transistor P4 has a source connected to receive ungated reference voltage TVDD and a drain connected to node O4. A body contact of PMOS transistor P4 is connected to receive ungated reference voltage TVDD. NMOS transistor N2 has a drain connected to node O4 and a source connected to receive a reference voltage VSS (e.g., a ground voltage). A body contact of NMOS transistor N2 is connected to receive reference voltage VBB. A gate contact of PMOS transistor P4 and a gate contact of NMOS transistor N2 are both connected to node O1. Control signal NSLEEPin' is provided at node O1.

Accordingly, if control signal NSLEEPin' is in a low voltage state (e.g., at or near VSS), then PMOS transistor P4 turns on and NMOS transistor N2 shuts off. PMOS transistor P4 thus pulls the voltage at node O4 up at or near TVDD so that control signal NSLEEPout is at or near TVDD. As such, the voltage at node O4 is in the high voltage state at or near TVDD. In this manner, control signal NSLEEPout indicates that header circuit 202 is turned on and is providing gated control voltage VVDD to gated power circuits 205A & 205B.

On the other hand, if control signal NSLEEPin' is in a high voltage state (at or near TVDD), then PMOS transistor P4 shuts off and NMOS transistor N2 turns on. NMOS transistor N2 thus pulls the voltage at node O4 down at or near VSS so that control signal NSLEEPout is in the low voltage state at or near VSS. In this manner, control signal NSLEEPout indicates that header circuit 202 is turned off so that power is cut off to each of gated power circuits 205A and 205B.

Figure 2B:
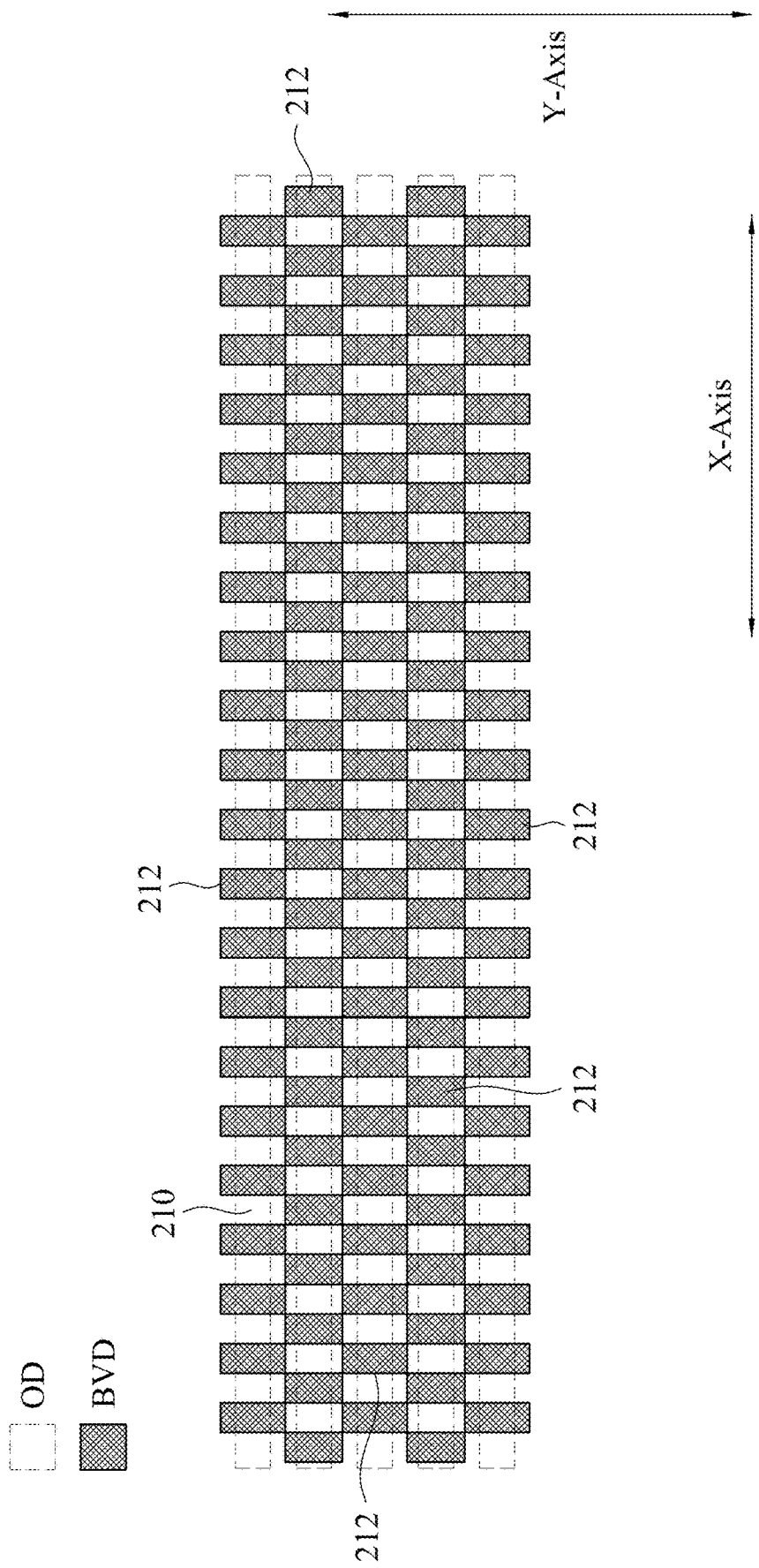
FIG. 2B is a layout diagram, in accordance with some embodiments.

FIG. 2B is a layout diagram, in accordance with some embodiments.

The layout diagram of FIG. 2B is representative of a semiconductor device. Structures in the semiconductor device are represented by patterns (also known as shapes) in the layout diagram. For simplicity of discussion, elements in the layout diagram of FIG. 2B (and of other figures included herein) will be referred to as if they are structures rather than patterns per se. For example, pattern 210 represents an active region (also known as an oxide-dimensioned (OD) region). In the following discussion, element 210 is referred to as active region 210 rather than active pattern 210.

FIG. 2B illustrates one example of a buried contact-to-transistor-component layer (layer BVD) that is provided beneath a semiconductor substrate (not shown in FIG. 2B). In some embodiments, buried layer BVD includes a plurality of buried contacts 212 (not all labeled for the sake of clarity) wherein plurality of buried contacts are provided in rows and columns that are spaced apart in a checkered pattern. As explained in further detail below, buried layer BVD is provided below semiconductor substrate 213. In some embodiments, buried layer BVD is provided below semiconductor substrate 213.

Semiconductor substrate 213 includes active regions 210, each active region 210 has a first long axis that extends in a first direction, which in this case is parallel to X-axis. In this embodiment, members of active regions 210 are substantially parallel to one another in first direction and members of active regions 210 are separated and substantially aligned relative to a second direction, which is substantially orthogonal to first direction and parallel to Y-axis. The term "substantially" is intended to allow for a parameter, in this case "orthogonal," to be true within relevant semiconductor manufacturing error tolerances.

Long axes of buried contacts 212 extend in direction of Y-axis. In FIG. 2B, buried contacts 212 are arranged relative to track lines (not shown). The track lines extend in the direction of the Y-axis. Relative to the X-axis, buried contacts 212 are aligned with corresponding ones of the tracks.

In this example, rows extend in the direction of the X-axis such that there are five rows of buried contacts 212, one for each of active regions 210. Other embodiments may have a different number of rows of buried contacts, depending on the number of active regions 210. Rows may start with an empty slot followed by a buried contact 212 and continue the pattern until the end of the row or may start with a buried contact 212 followed by an empty slot until the end of the row. From top to bottom relative to the Y-axis, for odd numbered tracks, the first row, the third row, and the fifth row have empty slots, and the second and fourth rows have a buried contact 212. From top to bottom relative to the Y-axis, for even numbered tracks, the first row, the third row, and the fifth row have a buried contact 212, and the second and fourth rows have an empty slot.

From top to bottom relative to the Y-axis, for even numbered tracks, the first active region 210 is connected to buried contacts 212 in the first row of buried contacts 212, third active region 210 is connected to buried contacts 212 in the third row of buried contacts 212, and fifth active region 210 is connected to buried contacts 212 in the fifth row of buried contacts 212. From top to bottom relative to the Y-axis, for odd numbered tracks, second active region 210 is connected to buried contacts 212 in the second row of buried contacts 212, and the fourth active region 210 is connected to buried contacts 212 in the fourth row of buried contacts 212. In this embodiment, there are forty-three tracks. In some embodiments, number of tracks is different than 43.

Buried contacts 212 have a checkered arrangement which resembles a checkerboard pattern. In this embodiment, there are forty-three tracks.

Figure 2C:
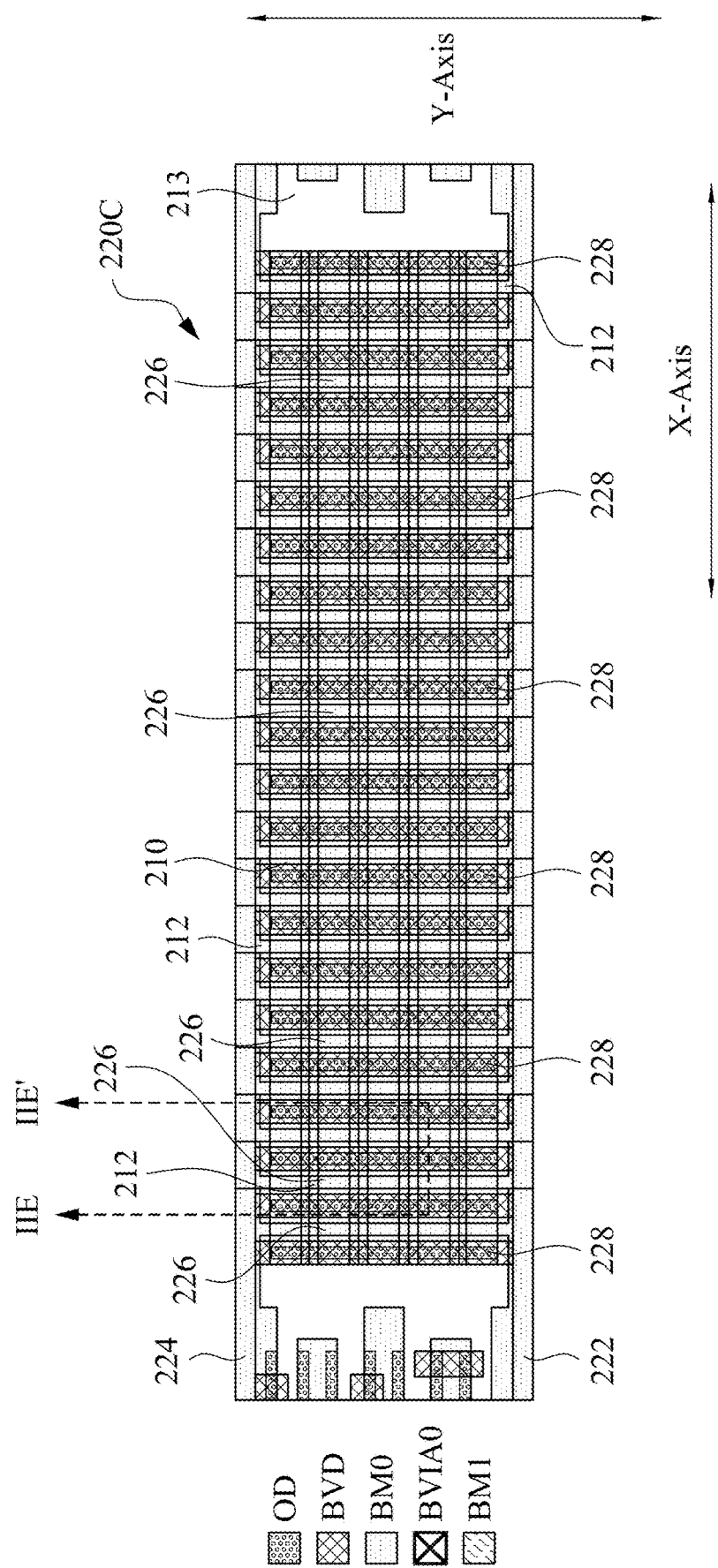
FIGS. 2C-2D are corresponding layout diagrams related to FIG. 2B, in accordance with some embodiments.
Figure 2D:
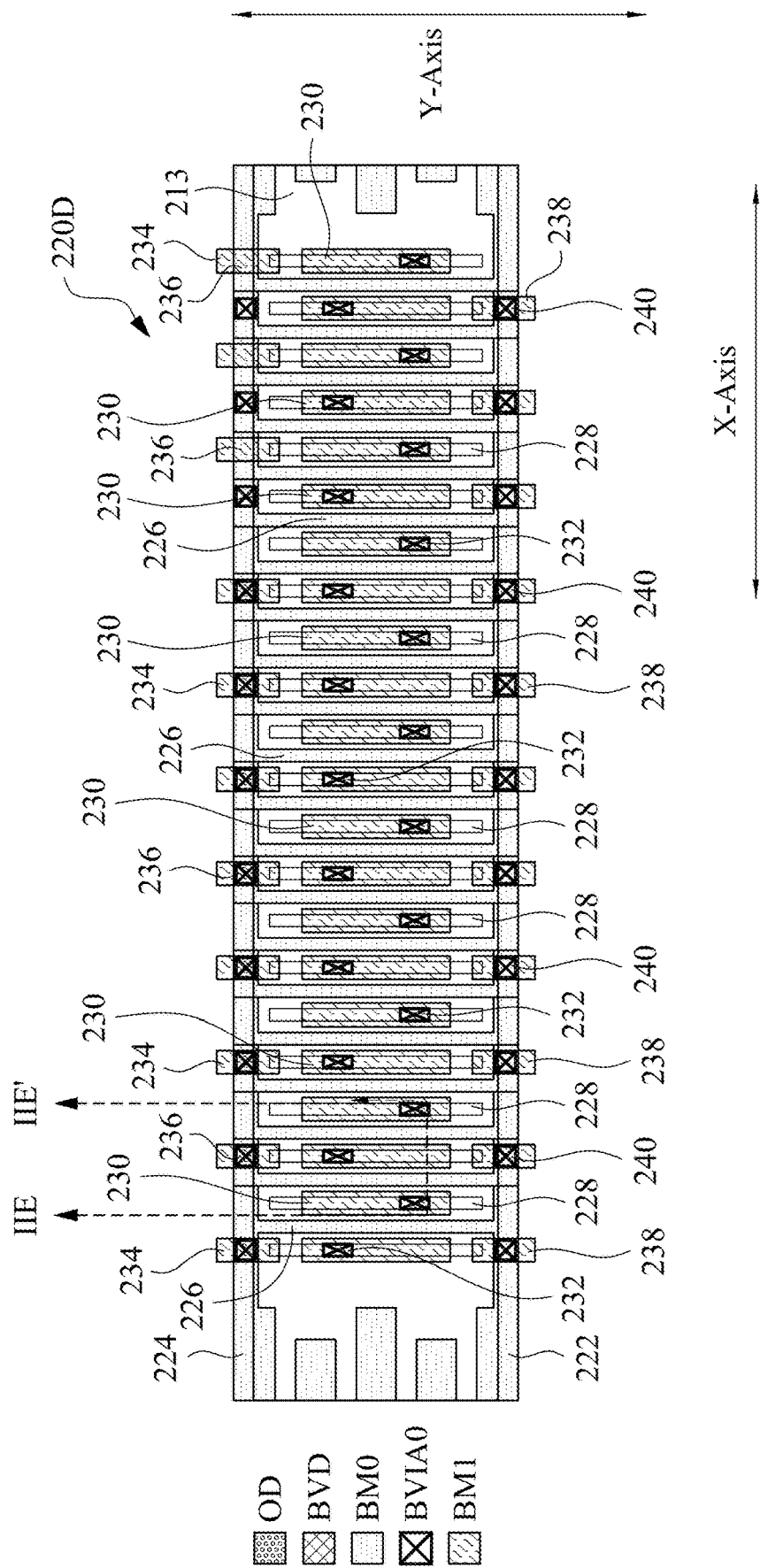

FIGS. 2C-2D are corresponding layout diagrams 220C and 220D, in accordance with some embodiments.

Together, layout diagrams 220C and 220D represent a header circuit, which is one example of header circuit 202 shown in FIG. 2A and an example of region 102 in FIG. 1.

Active regions 210 in FIG. 2C are connected to checkered buried contacts 212 below active regions 210 as described above with respect to FIG. 2B. In this example embodiment, there are five active regions 210. Other embodiments may include any suitable number of active regions. A first metal layer, in this case a buried BM0 layer, is provided below semiconductor substrate 213 and below buried layer BVD. Thus, layer BVD is provided between substrate 213 and first buried metal layer BM0.

Layout diagrams 220C and 220D assume a corresponding semiconductor process technology node which includes various design rules for generating a layout diagram, and further assume that the design rules follow a numbering convention in which a first level of metallization (M_1st) and a corresponding first level of interconnect structures (V_1st) are referred to correspondingly as M0 and V0. In some embodiments, the numbering convention assumes that the M_1st level and the V_1st level are referred to correspondingly as M1 and V1.

First metal layer BM0 includes first buried conductive rail 222 and a second buried conductive rail 224. First buried conductive rail 222 has a long axis that extends in the first direction parallel to the X-axis and second buried conductive rail 224 has a long axis that extends in the first direction parallel to the X-axis. First metal layer BM0 also includes a first set of conductive fingers 226 (not all labeled for the sake of clarity) and a second set of conductive fingers 228 (not all labeled for the sake of clarity). In this embodiment, there are 21 instances of conductive fingers 226 and 22 instances of conductive fingers 228. Other embodiments may have any suitable number of conductive fingers 226 and conductive fingers 228. Each conductive finger 226 and each conductive finger 228 has a long axis extending in the direction of the Y-axis and a short axis extending in the direction of the X-axis. In some embodiments, the conductive fingers 226 are configured to receive the gated reference voltage VVDD and the conductive fingers 228 are configured to receive the ungated reference voltage TVDD.

Each of conductive fingers 226 extends from first buried conductive rail 222 and from second buried conductive rail 224 so as to extend between first buried conductive rail 222 and second buried conductive rail 224. In this embodiment, each of buried conductive contacts 212 (see also FIG. 2B) in a given column amongst the even-numbered columns of conductive contacts 212 is connected to a corresponding one of conductive fingers 226 which is aligned with the given column. Furthermore, each of conductive fingers 226 in the first set of conductive fingers 226 extends beneath all of active regions 210. As explained below, buried conductive fingers 226 in the first set of conductive fingers 226 may be connected to provide gated reference voltage VVDD.

Though each of conductive fingers 228 in the second set of conductive fingers 228 has a long axis that extends in the direction of the Y-axis, nevertheless each of conductive fingers 228 is not connected to first buried conductive rail 222 nor to second buried conductive rail 224. In this embodiment, each of buried conductive contacts 212 (see also FIG. 2B) in a given column amongst the odd-numbered columns of conductive contacts 212 is connected to a corresponding one of conductive fingers 228 which is aligned with the given column. Furthermore, each of conductive fingers 228 in the second set of conductive fingers 228 extends beneath all of active regions 210. As explained below, buried conductive fingers 228 in the second set of conductive fingers 228 may be connected to provide gated reference voltage TVDD.

Furthermore, the second set of conductive fingers 228 is interleaved with the first set of conductive fingers 226. Relative to the X-axis, the left most conductive finger is one of conductive fingers 228 and the right most conductive fingers is one of conductive fingers 228. The left most conductive finger 228 has an adjacent one of conductive fingers 226 immediately to its right. Right most conductive finger 228 has an immediately adjacent one of conductive fingers 226 to its left. Other than left most conductive finger 228 and right most conductive fingers 228 at the ends, each one of conductive finger 228 is between a pair of conductive fingers 226. Each one of conductive fingers 226 is between a pair of conductive fingers 228. This particular arrangement is the result of there being one more instance of conductive finger 228 than there are instances of conductive finger 226. In other embodiments, there may be more instances of conductive finger 226 than there are instances of conductive finger 228. As a result, there would be conductive fingers 226 at the left most and right most ends instead of conductive fingers 228. If there were an equal number of conductive fingers 226 and conductive fingers 228, one of conductive fingers 226 would be at one end (either left most or right most end) and one of conductive fingers 228 would be at the other end (either right most or left most end).

Again, FIG. 2D is a layout diagram 220D, in accordance with some embodiments.

FIG. 2D illustrates additional features of header circuit 220 described above with respect to FIG. 2C. In particular, FIG. 2D illustrates additional features of buried via layer BVIA0 and another buried metal layer BM1. Buried via layer BVIA0 is below first metal layer BM0 and between first buried metal layer BM0 and second buried metal layer BM1. Second buried metal layer BM1 is beneath buried via layer BVIA0 and thus beneath first buried metal layer BM0.

Second buried metal layer BM1 includes a third set of buried conductive fingers 230 (not all labeled for the sake of clarity). Each buried conductive finger 230 in the third set of buried conductive fingers 230 is provided beneath a different one of the second set of buried conductive fingers 228 in first buried metal layer BM0. Layout diagram 220D further includes a set of vias 232 that are in a first buried interconnection layer BVIA0 and that connect buried conductive fingers 230 in the third set of buried conductive fingers 230 to buried conductive fingers 228 in second set of conductive fingers 228. Buried vias 232 that connect buried conductive fingers 230 in third set of buried conductive fingers 230 to buried conductive fingers 228 in second set of conductive fingers 228 are rectangular and have a width (parallel to the X-axis) that is substantially equal to a width (parallel to the X-axis) of buried conductive fingers 228. Buried conductive fingers 230 in third set of buried conductive fingers 230 have a width (relative to the X-axis) that is larger than the width of buried conductive fingers 228 in second set of conductive fingers 228. Furthermore, each of buried conductive fingers 230 is centered beneath a corresponding one of buried conductive fingers 228. This increases, if not maximizes, the contact area that connects buried conductive fingers 230 in third set of buried conductive fingers 230 to buried conductive fingers 228 in second set of conductive fingers 228.

Furthermore, every other one of buried vias 232 is aligned with a corresponding buried conductive contact 212 in the second row of corresponding column of buried conductive contacts 212 that buried conductive finger 228 is connected to. More specifically, each of the odd numbered conductive fingers is connected to a buried via 232 that is aligned with a buried conductive contact 212 that is in the second row of conductive contacts 212 (See FIG. 2B to see the second row of conductive contacts 212). Every other one of buried vias 232 is aligned with a corresponding buried conductive contact 212 in the fourth row of the corresponding column of buried conductive contacts 212 that buried conductive finger 228 is connected to. More specifically, of the buried conductive fingers 228, each of the even numbered conductive fingers is connected to a buried via 232 that is aligned with a buried conductive contact 212 that is in the fourth row of conductive contacts 212 (See FIG. 2B to see the fourth row of conductive contacts 212). Each of conductive fingers 230 is configured to receive TVDD. The arrangement of FIGS. 2C-2D described above increases the amount of surface area that provides connections to contacts 212 and vias 232 through conductive fingers 228. This reduces the resistance of the header circuit represented by layout diagrams 220C and 220D, and thus reduces the power consumption of the header circuit represented by layout diagrams 220C and 220D.

The buried metal layer BM1 also includes a first set of conductors 234 (not all labeled for the sake of clarity). First set of conductors 234 each have a long axis that extends in the second direction parallel to the Y-axis. Each of conductors 234 is provided beneath first buried conductive rail 222. Buried via layer BVIA0 also includes a set of vias 236 (not all labeled for the sake of clarity) that connects conductors 234 to first buried conductive rail 222. Conductors 234 are configured to receive gated reference voltage VVDD and thus first buried conductive rail 222 is provided at VVDD.

Buried metal layer BM1 also includes a second set of conductors 238 (not all labeled for the sake of clarity). Second set of conductors 238 each have a long axis that extends in the second direction parallel to the Y-axis. Each of conductors 238 is provided beneath second buried conductive rail 224. Buried via layer BVIA0 also includes a set of vias 240 (not all labeled for the sake of clarity) that connects conductors 238 to second buried conductive rail 224. Conductors 238 are configured to receive gated reference voltage VVDD and thus second buried conductive rail 224 is provided at VVDD. Note that first set of conductive fingers 226, second set of conductive fingers 228, and third set of conductive fingers 230 are all provided relative to second direction parallel to the Y-axis between first conductive rail 222 and second conductive rail 224. In some embodiments, the arrangement of FIGS. 2C-2D increases the effective area for connecting to TVDD by 250% and the effective area for connecting to VVDD by 160% thereby significantly decreasing the resistive load in the header circuit represented by layout diagrams 220C and 220D.

Figure 2E:
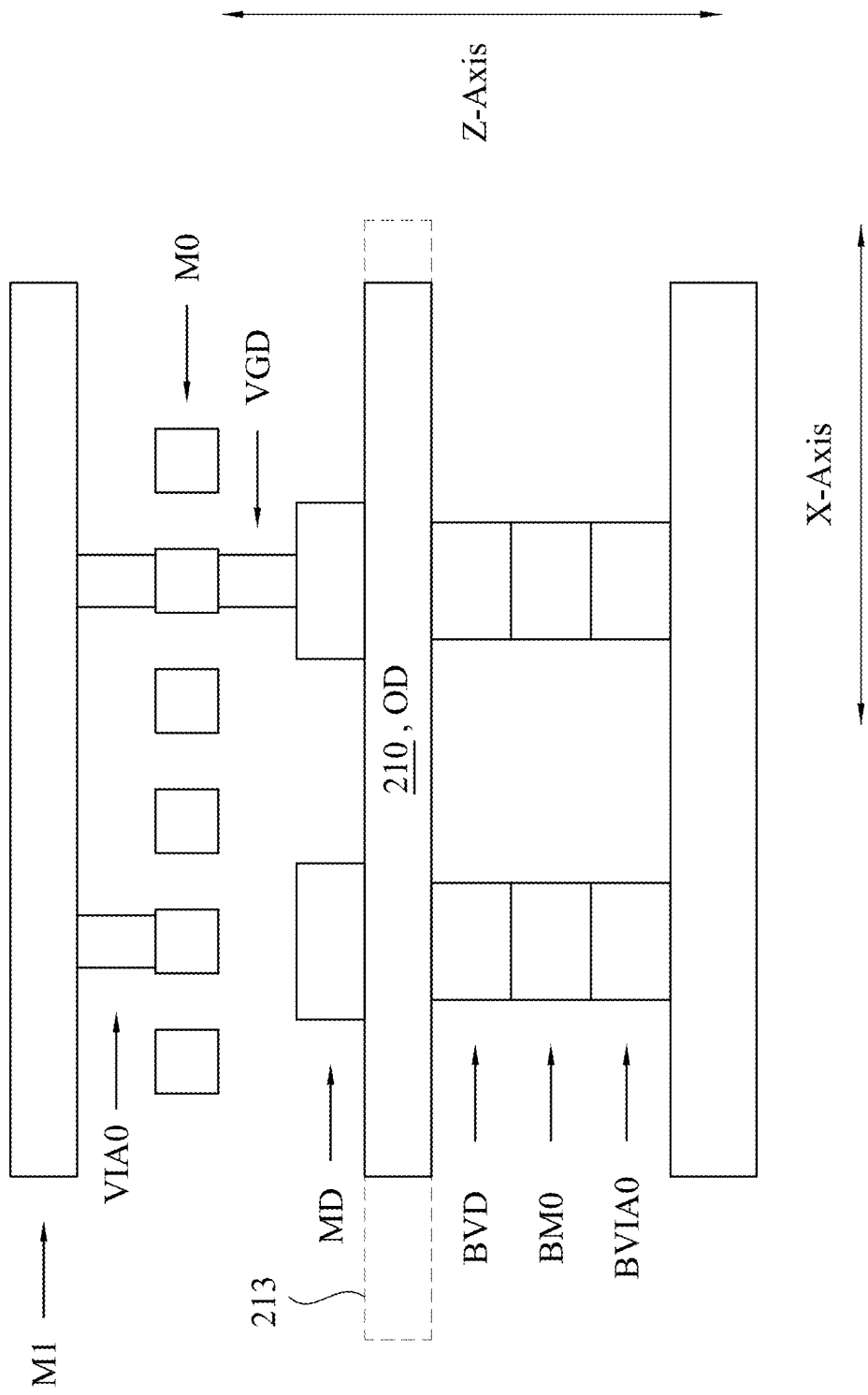
FIG. 2E is a cross-section related to FIGS. 2C-2D, in accordance with some embodiments.

FIG. 2E is a cross-section, in accordance with some embodiments.

More particularly, FIG. 2E illustrates a cross sectional area of a header circuit corresponding to cross-section indicator IIE-IIE' shown in each of layout diagrams 220C and 220D of corresponding FIGS. 2C and 2D.

The cross-section of FIG. 2E includes the semiconductor substrate 212, contact-to-transistor-component layer (layer BVD), buried metal layer BM0, buried via layer BVIA0, and buried metal layer BM1. Also shown are a metal-to-drain/source layer (MD layer), a via-to-gate/MD layer (VGD layer), a metal layer M0, via layer VIA0, and a metal layer M1. In some embodiments, the VGD layer is referred to as a via-to-MD layer (VD layer). From top to bottom relative to a Z-axis, metal layer M1, via layer VIA0, metal layer M0, VGD layer, MD layer, semiconductor substrate 213, layer BVD, buried metal layer BM0, buried via layer BVIA0, and buried metal layer BM1 form a stack of layers. The Z-axis is substantially orthogonal to both the X-axis (see FIGS. 2C and 2D) and the Y-axis. As shown in FIG. 2E, metal layer M1, via layer VIA0, metal layer M0, VGD layer and MD layer are stacked over semiconductor substrate 213. Active (OD) regions 210 are provided by semiconductor substrate 213. Metal layer M1, via layer VIA0, metal layer M0, VGD layer, and MD layer are used to form the contacts of transistors in the IC and for typical routing in an IC. Layer BVD, buried metal layer BM0, buried via layer BVIA0, and buried metal layer BM1 are stacked beneath semiconductor substrate 213 in that order from top to bottom. Since layer BVD, buried metal layer BM0, buried via layer BVIA0, and buried metal layer BM1 are stacked beneath semiconductor substrate 213, they are referred to as "buried" layers. Utilizing the arrangement described above and below, the layer BVD, buried metal layer BM0, buried via layer BVIA0, and buried metal layer BM1 are utilized to distributed VVDD and TVDD in a header circuit, such as header circuit 220.

Figure 3:
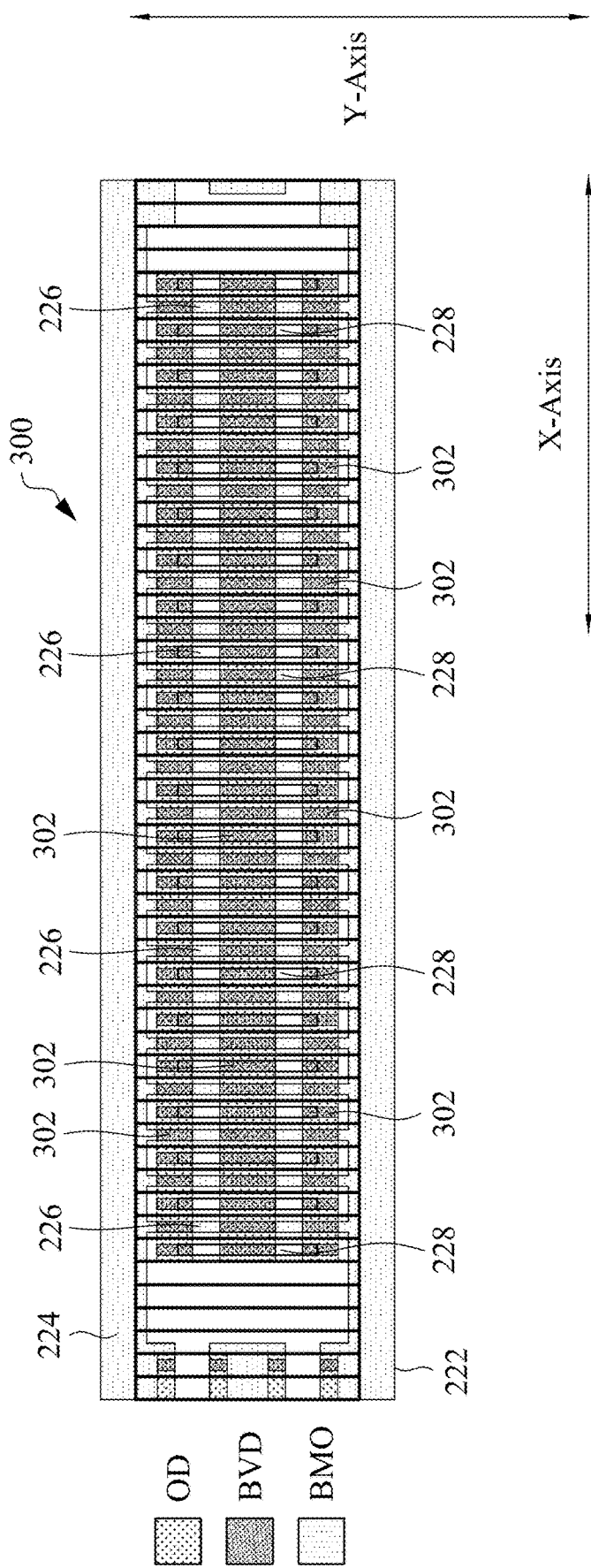
FIG. 3 is a layout diagram, in accordance with some embodiments.

FIG. 3 is a layout diagram 300, in accordance with some embodiments.

FIG. 3 represents another example of a header circuit 300, which is one example of header circuit 202 shown in FIG. 2A and an example of region 102 in FIG. 1. Layout diagram 300 is similar to layout diagram 220C and 220D shown in corresponding FIGS. 2C and 2D. Accordingly, the discussion will concentrate on the differences between layout diagram 300 and layout diagrams 220C-220D for the sake of brevity.

In FIG. 3, layout diagram 300 includes a set of three active regions 210 instead of five active regions 210 as in layout diagrams 220C-220D. Furthermore, in this embodiment, top most active region 210 and bottom most active region 210 are substantially equal in width (relative to the Y-axis) while intermediate active region 210 is wider than top most active region 210 and bottom most active region 210. In this embodiment, intermediate active region 210 is approximately twice as wide as top most active region 210 and bottom most active region 210. Other implementations may have other suitable ratios between active regions 210. Furthermore, in other embodiments, all of active regions 210 may be provided in different sizes.

Layout diagram 300 has first buried metal layer BM0 arranged in the same manner described above with respect to FIG. 2C and FIG. 2D. Thus, first set of conductive fingers 226 (not all labeled for the sake of clarity), second set of conductive fingers 228 (not all labeled for the sake of clarity), first buried conductive rail 222, and second buried conductive rail 224 are provided in the same manner described above with respect to FIG. 2C and FIG. 2D. However, in FIG. 3, layer BVD has a different arrangement than the arrangement shown in FIG. 2B. Rather than being checkered, three rows of buried conductive contacts 302 (not all labeled for the sake of clarity) are provided in layer BVD. From top to bottom relative to the Y-axis, first row of buried conductive contacts 302 are connected to first active region 210, second row of buried conductive contacts 302 is connected to second active region 210, and third row of buried conductive contacts 302 is connected to third active region 210. While there is spacing between buried conductive contacts 302 in each row, there are no empty slots within the rows. Thus, first layer BVD does not have a checkered pattern.

Relative to the Y-axis, a size of each of buried conductive contacts 302 is substantially equal to the size of active region 210 to which it is connected. Thus, relative to the Y-axis, buried conductive contacts 302 in the second row of buried conductive contacts 302 have a size that is substantially twice as long as a size of buried conductive contacts 302 in the first row of buried conductive contacts 302. Additionally, relative to the Y-axis, buried conductive contacts 302 in the second row of buried conductive contacts 302 have a size that is substantially twice as long as the size of buried conductive contacts 302 in the third row of buried conductive contacts 302. Relative to the Y-axis, the size of buried conductive contacts 302 in the first row of buried conductive contacts 302 and the size of buried conductive contacts 302 in the third row of buried conductive contacts 302 is substantially equal.

With respect to the columns of buried conductive contact 302, each of the columns has a buried conductive contact 302, an empty slot, a buried conductive contact 302, an empty slot, and then a buried conductive contact 302. Relative to the Y-axis, second buried conductive contact 302 in each of the columns has a size twice as long as the size of first buried conductive contact 302 and third buried conductive contact 302 in each of the columns. There are a total of 43 columns of buried conductive contacts 302 in this embodiment. From left to right relative to the X-axis, every even numbered column of buried conductive contacts 302 is connected to a different one of buried conductive fingers 226 in the first set of conductive fingers 226 while every odd numbered column of the buried conductive contacts 302 is connected to a different one of buried conductive fingers 228. The even numbered columns of buried conductive contacts 302 and buried conductive fingers 226 are provided at VVDD while the odd numbered columns of buried conductive contacts 302 and buried conductive fingers 228 are provided at TVDD.

In FIG. 3, relative to the X-axis, a width of conductive contacts 302 is substantially equal to a width of conductive finger 226 or conductive finger 228 to which it is attached. Also, in this embodiment, buried conductive fingers 226 and buried conductive fingers 228 all have widths that are substantially equal. Thus, buried conductive contacts 302 have substantially equal widths. In other embodiments, buried conductive fingers 226 and buried conductive fingers 228 have different widths. In still other embodiments, different subsets of buried conductive fingers 226 may have different widths and different subsets of buried conductive fingers 228 have different widths. Accordingly, different subsets of conductive contacts 302 may have different widths depending on the configuration of active regions 210 and conductive fingers 226, 228 to which it is connected.

Figure 4A:
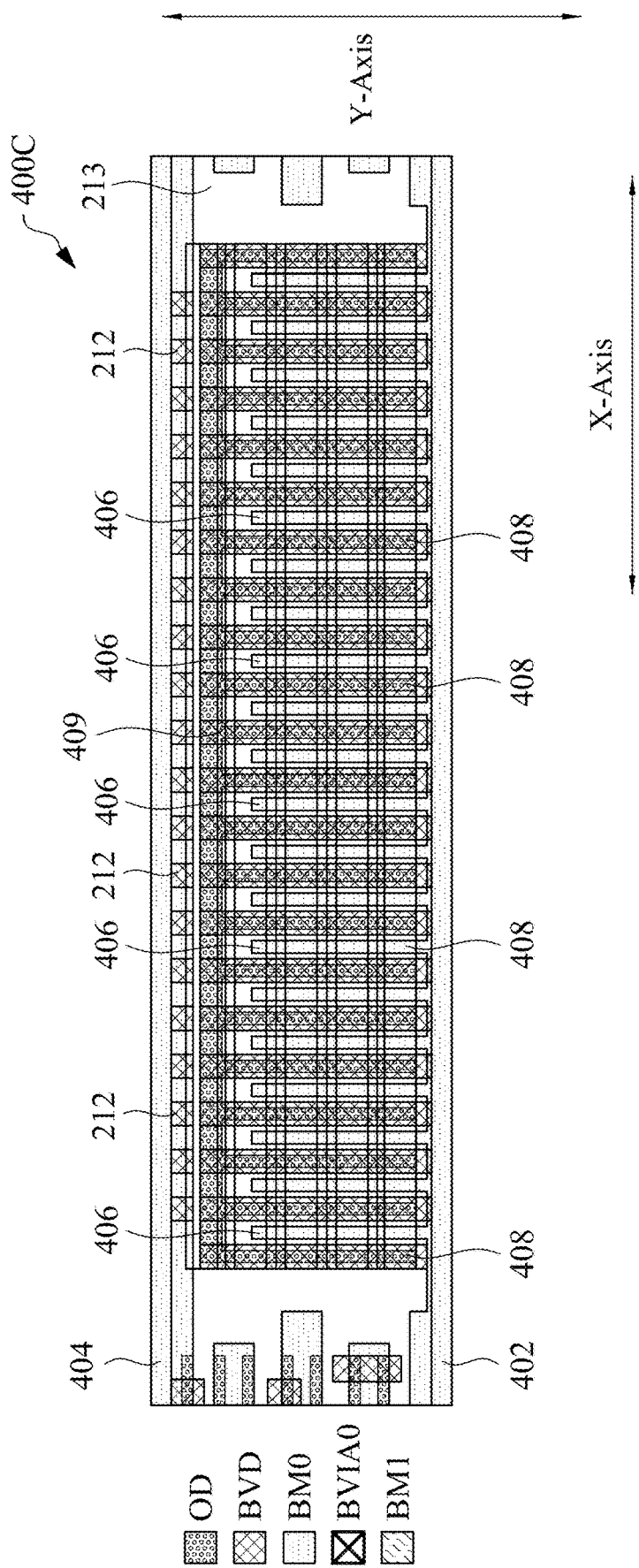
FIGS. 4A-4B are corresponding layout diagrams, in accordance with some embodiments.
Figure 4B:
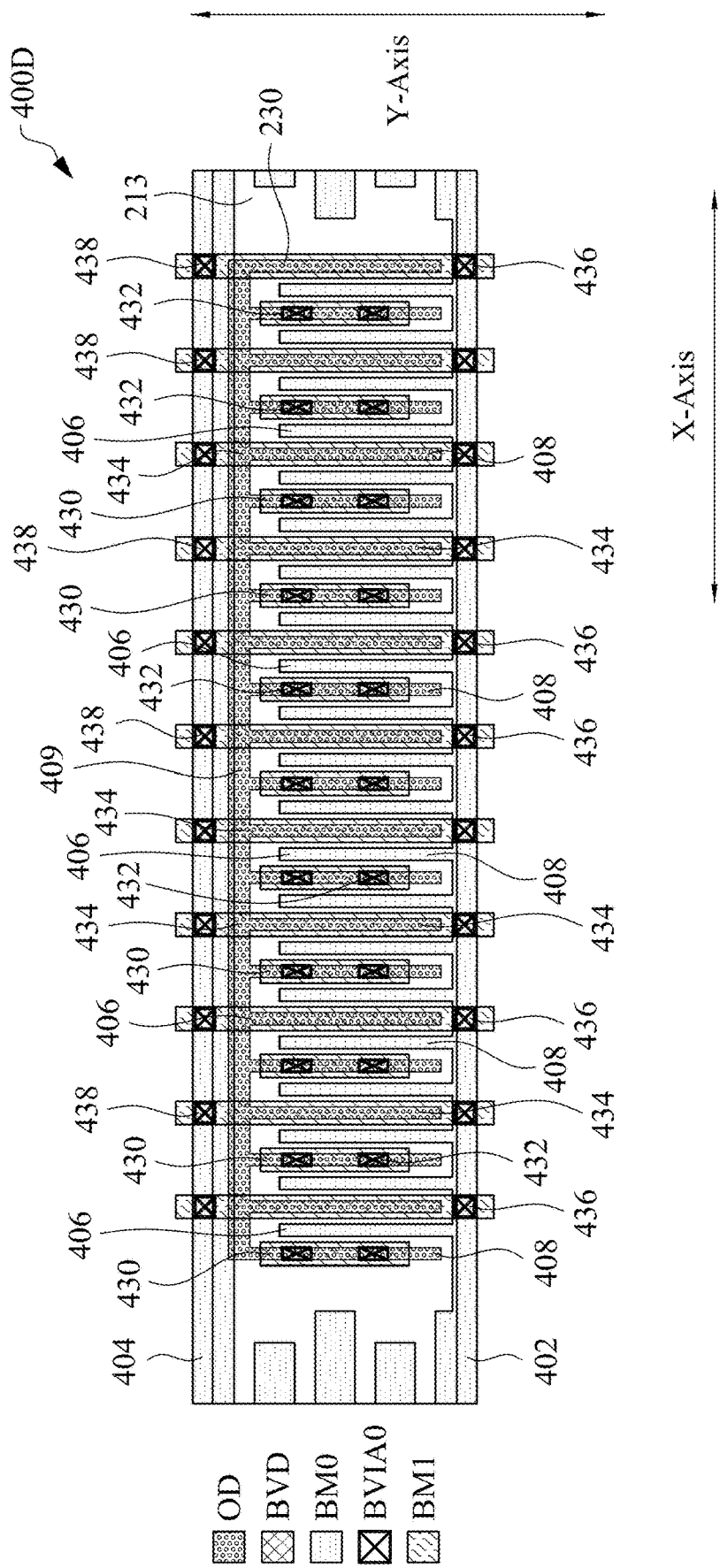

FIGS. 4A-4B are corresponding layout diagrams 400C and 400D, in accordance with some embodiments.

Together, layout diagrams 400C and 400D represent a header circuit, which is one example of header circuit 202 shown in FIG. 2A and an example of region 102 in FIG. 1. Semiconductor substrate 213 includes a set of active regions 210, each active region 210 in active regions 210 has a first long axis that extends in a first direction, which in this case is parallel to the X-axis. In this embodiment, members of active regions 210 are substantially parallel to one another in the first direction and the members of active regions 210 are separated and substantially aligned relative to a second direction, which is substantially orthogonal to the first direction and parallel to the Y-axis. Active regions 210 are arranged in semiconductor substrate 213 in the same manner described above with respect to FIG. 2C.

FIG. 4A illustrates features of header circuit.

Active regions 210 in FIG. 4A are connected to checkered buried contacts 212 below active regions 210 as described above with respect to FIG. 2B. The first buried metal layer, in this case a buried BM0 layer, is provided below semiconductor substrate 213 and below layer BVD. Thus, layer BVD is provided between substrate 213 and first buried metal layer BM0. First metal layer BM0 includes first buried conductive rail 402 and a second buried conductive rail 404. First buried conductive rail 402 has a long axis that extends in the first direction parallel to the X-axis and second buried conductive rail 404 has a long axis that extends in the first direction parallel to the X-axis. First metal layer BM0 also includes a first set of conductive fingers 406 (not all labeled for the sake of clarity) and a second set of conductive fingers 408 (not all labeled for the sake of clarity). In this embodiment, there are 21 of the conductive fingers 406 and 22 of the conductive fingers 408. Other embodiments may have any suitable number of conductive fingers 406 and conductive fingers 408. Additionally, the first buried metal layer includes a conductive trace 409 having a long axis that extends in the first direction.

Each of conductive fingers 406 in the first set of conductive fingers 406 has a long axis that extends in the second direction that is parallel to the Y-axis (substantially orthogonal to the first direction and the Y-axis). Each of conductive fingers 406 also extend from first buried conductive rail 402 but is unconnected to second buried conductive rail 404. Furthermore, each of conductive fingers 408 in the second set of conductive fingers 408 has a long axis that extends in the second direction that is parallel to the Y-axis (substantially orthogonal to the first direction and the Y-axis). Each of conductive fingers 408 also extend from buried conductive trace 409 but is unconnected to first buried conductive rail 402 second buried conductive rail 404.

In this embodiment, each of conductive fingers 406 is connected to each of buried conductive contacts 212 (shown in FIG. 2B) in the even columns of conductive contacts 212 in layer BVD. Furthermore, each of conductive fingers 406 in the first set of conductive fingers 406 extends beneath the bottom four active regions 210 relative to the X-axis. As explained below, buried conductive fingers 406 in the first set of conductive fingers 406 may be connected to provide gated reference voltage VVDD.

Each of conductive fingers 408 in the second set of conductive fingers 408 has a long axis that extends in a second direction that is parallel to the Y-axis (substantially orthogonal to the first direction and the Y-axis). However, each of conductive fingers 408 also are not connected to first buried conductive rail 402 and second buried conductive rail 404. Instead, conductive fingers 408 extend in the second direction from conductive trace 409. In this embodiment, each of buried conductive fingers 408 is connected to each of buried conductive contacts 212 (shown in FIG. 2B) in the odd columns of conductive contacts 212 in the layer BVD. Furthermore, each of conductive fingers 408 in the second set of conductive fingers 408 extends beneath the bottom four of the active regions 210. As explained below, buried conductive fingers 408 in the second set of conductive fingers 408 may be connected to provide gated reference voltage TVDD.

Furthermore, the second set of conductive fingers 408 is interleaved with the first set of conductive fingers 406. Relative to the X-axis, the left most conductive finger is one of conductive fingers 408 and the right most conductive fingers is one of conductive fingers 408. The left most conductive finger 408 has an adjacent one of conductive fingers 406 immediately to its right. The right most conductive finger 408 has an adjacent one of conductive fingers 406 immediately to its left. Other than the left most conductive finger 408 and the right most conductive fingers 408 at the ends, every other conductive fingers 408 is between a pair of conductive fingers 406. Each of conductive fingers 406 is between a pair of conductive fingers 408. This particular arrangement is the result of there being one more conductive fingers 408 than conductive fingers 406. In other embodiments, there may be one more conductive finger 406 than conductive finger 408. As a result, there would be conductive fingers 406 at the left most and right most ends instead of conductive fingers 408. If there were an equal number of conductive fingers 406 and conductive fingers 408, one of conductive fingers 406 would be at one end (either left most or right most end) and one of conductive fingers 408 would be at the other end (either right most or left most end). Since conductive fingers 408 extend from conductive trace 409 and conductive fingers 406 extend from conductive rail 402, the interleaving of conductive fingers 406 and conductive fingers 408 provide a combed structure.

Conductive fingers 406, conductive fingers 408, and conductive trace 409 are provided between first conductive rail 402 and second conductive rail 404 relative to the second direction, which is parallel to the Y-axis. Conductive trace 409 is connected to the first row of conductive contacts 212 in layer BVD. Conductive trace 409 is provided at gated reference voltage TVDD.

FIG. 4B illustrates additional features of header circuit described above with respect to FIG. 4A.

In particular, FIG. 4B illustrates additional features of buried via layer BVIA0 and another buried metal layer BM1. Buried via layer BVIA0 is below first metal layer BM0 and between first buried metal layer BM0 and second buried metal layer BM1. Second buried metal layer BM1 is beneath buried via layer BVIA0 and thus beneath first buried metal layer BM0.

Second buried metal layer BM1 includes a third set of buried conductive fingers 430 (not all labeled for the sake of clarity). From left to right relative to the X-axis, each buried conductive finger 430 in the third set of buried conductive fingers 430 is provided beneath every odd numbered one of the second set of buried conductive fingers 408 in first buried metal layer BM0. Second buried via layer BVIA0 includes a set of vias 432 that connect buried conductive fingers 430 in the third set of buried conductive fingers 430 to buried conductive fingers 408 in the second set of conductive fingers 408. Buried vias 432 that connect buried conductive fingers 430 in the third set of buried conductive fingers 430 to buried conductive fingers 408 in the second set of conductive fingers 408 are rectangular and have a width (parallel to the X-axis) that is substantially equal to a width (parallel to the X-axis) of buried conductive fingers 408. Buried conductive fingers 430 in the third set of buried conductive fingers 430 have a width (relative to the X-axis) that is larger than the width of buried conductive fingers 408 in the second set of conductive fingers 408. Furthermore, each of buried conductive fingers 430 is centered beneath a corresponding one of buried conductive fingers 408. This maximizes the contact area that connects buried conductive fingers 430 in the third set of buried conductive fingers 430 to buried conductive fingers 408 in the second set of conductive fingers 408. There are two of vias 432 are provided on every odd numbered conductive finger 430. One of two vias 432 is aligned below second active region 210 and the other one of two vias 432 is aligned below fourth active region 210.

Second buried metal layer BM1 includes a fourth set of buried conductive fingers 434 (not all labeled for the sake of clarity). From left to right relative to the X-axis, each buried conductive finger 434 in the fourth set of buried conductive fingers 434 is provided beneath every even numbered one of the first set of buried conductive fingers 406 in first buried metal layer BM0. Each buried conductive finger 434 in the fourth set of buried conductive fingers 434 also extends from first conductive rail 402 to second conductive rail 404. Second buried via layer BVIA0 includes a set of vias 436 that connect buried conductive fingers 434 in the fourth set of buried conductive fingers 434 to first conductive rail 402. Second buried via layer BVIA0 includes another set of vias 438 that connect buried conductive fingers 434 in the fourth set of buried conductive fingers 434 to second conductive rail 404. First conductive rail 402 and second conductive rail 404 are connected to provide gated reference voltage VVDD. In some embodiments, the arrangement increases the effective area for connecting to TVDD by 160% and the effective area for connecting to VVDD by 148% thereby significantly decreasing the resistive load in the header circuit 400.

FIG. 5 is a flowchart of a method 500 of generating a layout diagram, in accordance with some embodiments.

Method 500 is implementable, for example, using EDA system 700 (FIG. 7, discussed below) and an integrated circuit (IC), manufacturing system 800 (FIG. 8, discussed below), in accordance with some embodiments. Regarding method 500, examples of the layout diagram include the layout diagrams disclosed herein, or the like. Examples of a semiconductor device which can be manufactured according to method 500 include semiconductor device 100 FIG. 1.

In FIG. 5, method 500 includes blocks 502-504. At block 502, a layout diagram is generated which, among other things, include patterns represent one or more BCL CFETs as disclosed herein, or the like. An example of a semiconductor device corresponding to a layout diagram generated by block 502 includes semiconductor device 100 of FIG. 1. Block 502 is discussed in more detail below with respect to FIG. 6. From block 502, flow proceeds to block 504.

At block 504, based on the layout diagram, at least one of (A) one or more photolithographic exposures are made or (B) one or more semiconductor masks are fabricated or (C) one or more components in a layer of a semiconductor device are fabricated. See discussion below of FIG. 7.

Figure 6:
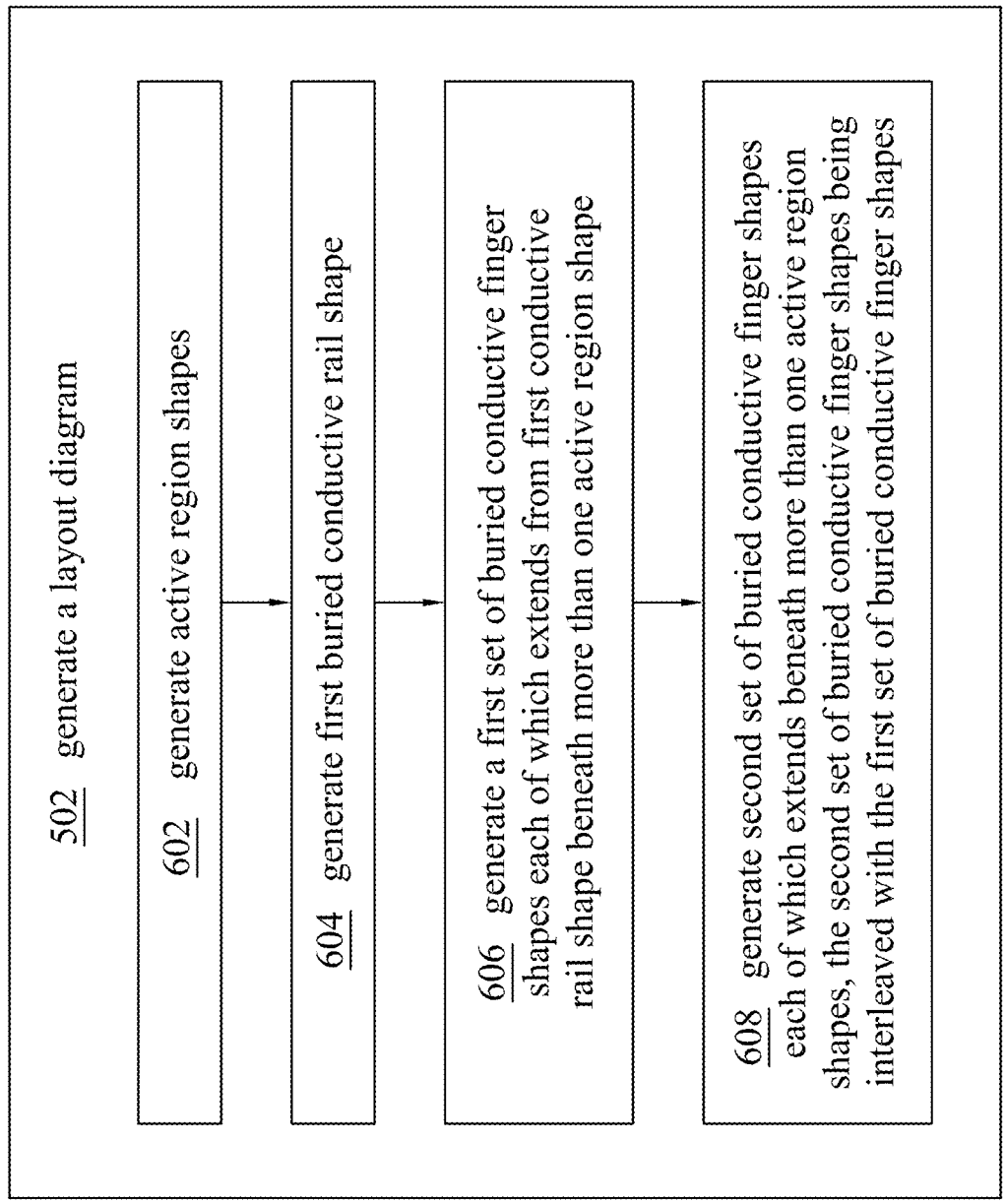
FIG. 6 is a flowchart of a method, in accordance with some embodiments.

FIG. 6 is a flowchart of a method of generating a layout diagram, in accordance with some embodiments.

More particularly, the flowchart of FIG. 6 shows one example of procedures that may be implemented in block 502 of FIG. 5, in accordance with one or more embodiments.

In FIG. 6, block 502 includes blocks 602-608. At block 602, active region shapes are generated, wherein each active region shape of the active region shapes has a first long axis that extends in a first direction on a semiconductor substrate shape. An example of the first direction is the X-axis. Examples of the active region shapes would be active region shapes that correspond to the active regions 210 in FIGS. 2C, 2D, 4A, 4B in a layout diagram. From block 602, flow proceeds to block 604.

At block 604, a first buried conductive rail shape is generated that has a second long axis that extends in the first direction. Examples of the first conductive rail shapes are shapes that correspond with the first buried conductive rail 222 in FIGS. 2C, 2D, 3 and first buried conductive rail 402 in FIGS. 4A, 4B in a layout diagram. From block 604, flow proceeds to block 606.

At block 606, a first set of buried conductive finger shapes is generated that extends from the first conductive rail shape. Each buried conductive finger shape in the first set of buried conductive finger shapes has a third long axis that extends in a second direction, the second direction being substantially orthogonal to the first direction. Also, the first set of buried conductive finger shapes extends beneath more than one of the set of active region shapes. An example of the second direction is the Y-axis. Furthermore, examples of the first set of buried conductive fingers shapes are shapes that correspond to the first set of buried conductive fingers 226 in FIGS. 2C, 2D, 3 and the first set of buried conductive fingers 406 in FIG. 4A, 4B in a layout diagram.

At block 608, a second set of buried conductive finger shapes is generated. Each buried conductive finger shape in the second set of buried conductive finger shapes has a fourth long axis that extends in the second direction. Also, the second set of buried conductive finger shapes extends beneath more than one of the set of active region shapes and the second set of buried conductive finger shapes are interleaved with the first set of buried conductive finger shapes. Examples of the second set of buried conductive fingers shapes are shapes that correspond to the second set of buried conductive fingers 228 in FIGS. 2C, 2D, 3 and the second set of buried conductive fingers 406 in FIG. 4A, 4B in a layout diagram.

Figure 7:
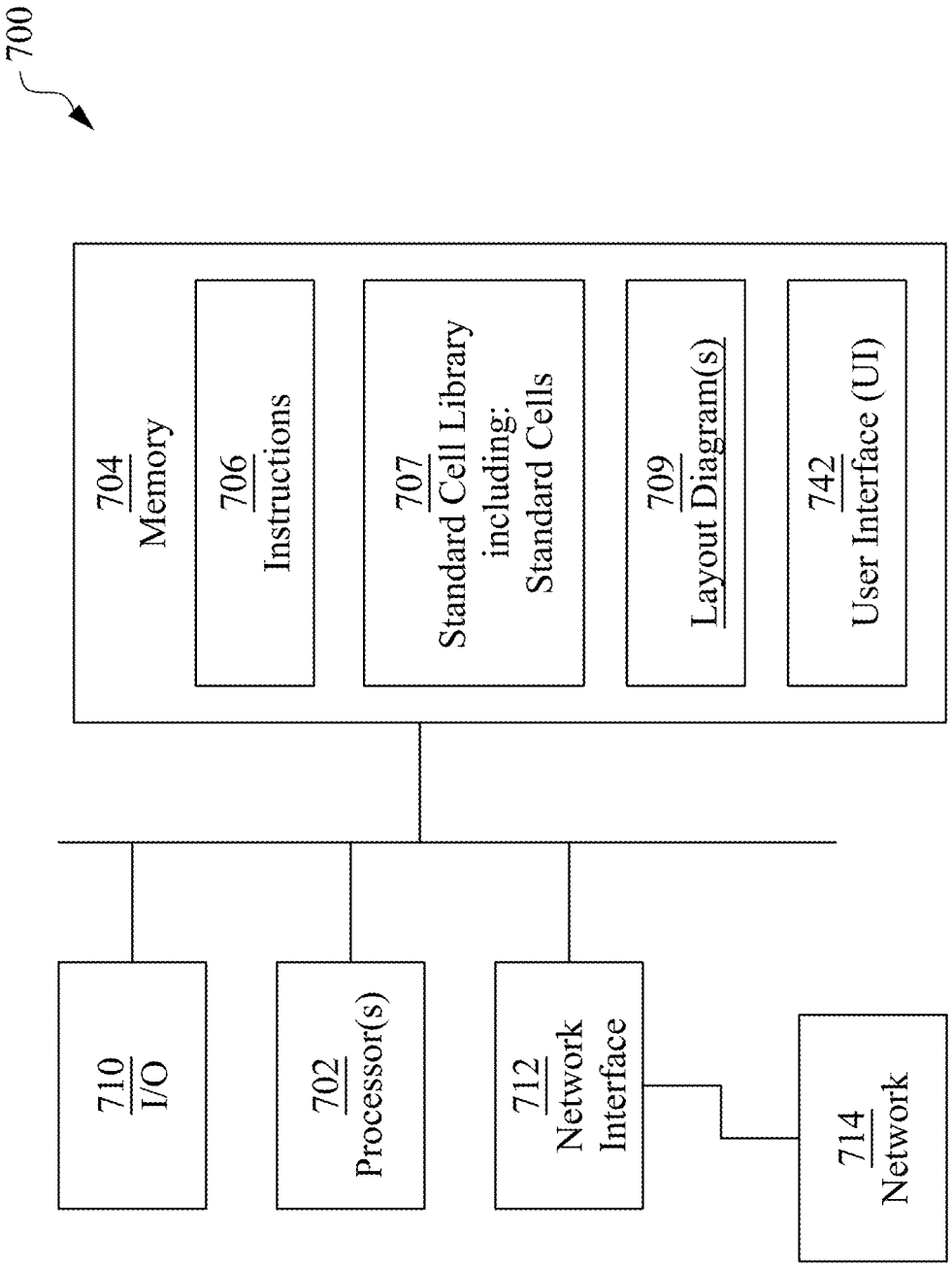
FIG. 7 is a block diagram of an electronic design automation (EDA) system, in accordance with some embodiments.

FIG. 7 is a block diagram of an electronic design automation (EDA) EDA system 700 in accordance with some embodiments. The EDA system 700 is configured to generate a layout diagram as described above with respect to FIG. 6.

In some embodiments, EDA system 700 includes an APR system. Methods described herein of designing layout diagrams represent wire routing arrangements, in accordance with one or more embodiments, are implementable, for example, using EDA system 700, in accordance with some embodiments.

In some embodiments, EDA system 700 is a general purpose computing device including at least one hardware processor 702 and a non-transitory, computer-readable storage medium 704. Storage medium 704, amongst other things, is encoded with, i.e., stores, computer program code 706, i.e., a set of computer-executable instructions. Execution of instructions 706 by hardware processor 702 represents (at least in part) an EDA tool which implements a portion or all of the methods described herein in accordance with one or more embodiments (hereinafter, the noted processes and/or methods). Storage medium 704, amongst other things, includes layout diagram(s) 709.

Processor 702 is electrically connected to computer-readable storage medium 704 via a bus 708. Processor 702 is also electrically connected to an I/O interface 710 by bus 708. A network interface 712 is also electrically connected to processor 702 via bus 708. Network interface 712 is connected to a network 714, so that processor 702 and computer-readable storage medium 704 are capable of connecting to external elements via network 714. Processor 702 is configured to execute computer program code 706 encoded in computer-readable storage medium 704 in order to cause system 700 to be usable for performing a portion or all of the noted processes and/or methods. In one or more embodiments, processor 702 is a central processing unit (CPU), a multi-processor, a distributed processing system, an application specific integrated circuit (ASIC), and/or a suitable processing unit.

In one or more embodiments, computer-readable storage medium 704 is an electronic, magnetic, optical, electromagnetic, infrared, and/or a semiconductor system (or apparatus or device). For example, computer-readable storage medium 704 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 704 includes a compact disk-read only memory (CD-ROM), a compact disk-read/write (CD-R/W), and/or a digital video disc (DVD).

In one or more embodiments, storage medium 704 stores computer program code 706 configured to cause EDA system 700 (where such execution represents (at least in part) the EDA tool) to be usable for performing a portion or all of the noted processes and/or methods. In one or more embodiments, storage medium 704 also stores information which facilitates performing a portion or all of the noted processes and/or methods. In one or more embodiments, storage medium 704 stores library 707 of standard cells including such standard cells disclosed herein.

EDA system 700 includes I/O interface 710. I/O interface 710 is connected to external circuitry. In one or more embodiments, I/O interface 710 includes a keyboard, keypad, mouse, trackball, trackpad, touchscreen, and/or cursor direction keys for communicating information and commands to processor 702.

EDA system 700 also includes network interface 712 connected to processor 702. Network interface 712 allows EDA system 700 to communicate with network 714, to which one or more other computer systems are connected. Network interface 712 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 700.

EDA system 700 is configured to receive information through I/O interface 710. The information received through I/O interface 710 includes one or more of instructions, data, design rules, libraries of standard cells, and/or other parameters for processing by processor 702. The information is transferred to processor 702 via bus 708. EDA system 700 is configured to receive information related to a UI through I/O interface 710. The information is stored in computer-readable medium 704 as user interface (UI) 742.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 700. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 8:
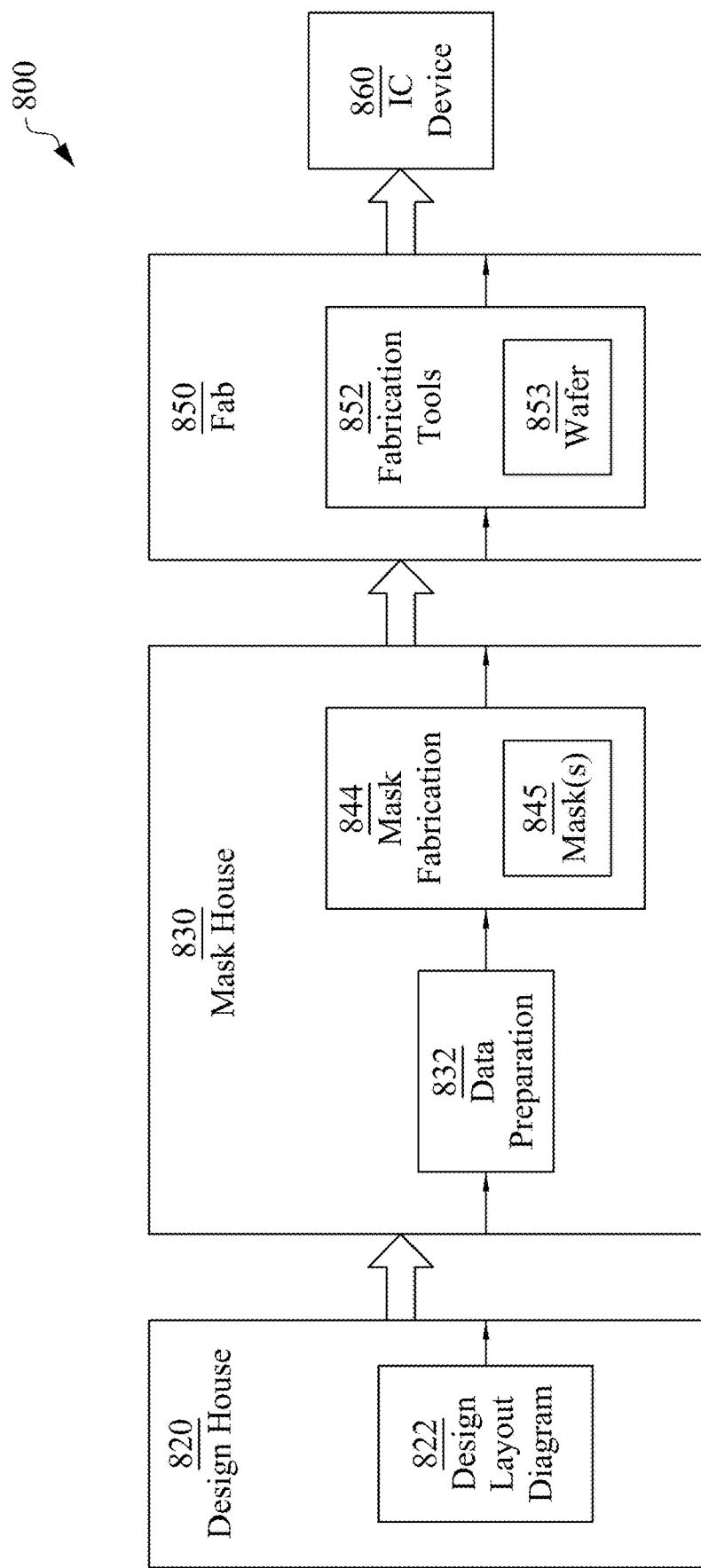
FIG. 8 is a block diagram of a semiconductor device manufacturing system, and an IC manufacturing flow associated therewith, in accordance with some embodiments.

FIG. 8 is a block diagram of an integrated circuit (IC) manufacturing system 800, and an IC manufacturing flow associated therewith, in accordance with some embodiments. The manufacturing system 800 is configured to manufacture the semiconductor device 100 (See FIG. 1) described above.

In some embodiments, based on a layout diagram, e.g., at least one of (A) one or more semiconductor masks or (B) at least one component in a layer of a semiconductor integrated circuit is fabricated using manufacturing system 800.

In FIG. 8, IC manufacturing system 800 includes entities, such as a design house 820, a mask house 830, and an IC manufacturer/fabricator ("fab") 850, that interact with one another in the design, development, and manufacturing cycles and/or services related to manufacturing an IC device 860. The entities in system 800 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 820, mask house 830, and IC fab 850 is owned by a single larger company. In some embodiments, two or more of design house 820, mask house 830, and IC fab 850 coexist in a common facility and use common resources.

Design house (or design team) 820 generates an IC design layout diagram 822. IC design layout diagram 822 includes various geometrical patterns designed for an IC device 860. The geometrical patterns correspond to patterns of metal, oxide, or semiconductor layers that make up the various components of IC device 860 to be fabricated. The various layers combine to form various IC features. For example, a portion of IC design layout diagram 822 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 820 implements a proper design procedure to form IC design layout diagram 822. The design procedure includes one or more of logic design, physical design or place and route. IC design layout diagram 822 is presented in one or more data files having information of the geometrical patterns. For example, IC design layout diagram 822 can be expressed in a GDSII file format or DFII file format.

Mask house 830 includes data preparation 832 and mask fabrication 844. Mask house 830 uses IC design layout diagram 822 to manufacture one or more masks 845 to be used for fabricating the various layers of IC device 860 according to IC design layout diagram 822. Mask house 830 performs mask data preparation 832, where IC design layout diagram 822 is transformed into a representative data file ("RDF"). Mask data preparation 832 provides the RDF to mask fabrication 844. Mask fabrication 844 includes a mask writer. A mask writer converts the RDF to an image on a substrate, such as a mask (reticle) 845 or a semiconductor wafer 853. The design layout diagram 822 is manipulated by mask data preparation 832 to comply with particular characteristics of the mask writer and/or requirements of IC fab 850. In FIG. 8, mask data preparation 832 and mask fabrication 844 are illustrated as separate elements. In some embodiments, mask data preparation 832 and mask fabrication 844 can be collectively referred to as mask data preparation.

In some embodiments, mask data preparation 832 includes optical proximity correction (OPC) which uses lithography enhancement techniques to compensate for image errors, such as those that can arise from diffraction, interference, other process effects and the like. OPC adjusts IC design layout diagram 822. In some embodiments, mask data preparation 832 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 832 includes a mask rule checker (MRC) that checks the IC design layout diagram 822 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 822 to compensate for limitations during mask fabrication 844, which may undo part of the modifications performed by OPC in order to meet mask creation rules.

In some embodiments, mask data preparation 832 includes lithography process checking (LPC) that simulates processing that will be implemented by IC fab 850 to fabricate IC device 860. LPC simulates this processing based on IC design layout diagram 822 to create a simulated manufactured device, such as IC device 860. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 822.

It should be understood that the above description of mask data preparation 832 has been simplified for the purposes of clarity. In some embodiments, data preparation 832 includes additional features such as a logic operation (LOP) to modify the IC design layout diagram 822 according to manufacturing rules. Additionally, the processes applied to IC design layout diagram 822 during data preparation 832 may be executed in a variety of different orders.

After mask data preparation 832 and during mask fabrication 844, a mask 845 or a group of masks 845 are fabricated based on the modified IC design layout diagram 822. In some embodiments, mask fabrication 844 includes performing one or more lithographic exposures based on IC design layout diagram 822. In some embodiments, an electron-beam (e-beam) or a mechanism of multiple e-beams is used to form a pattern on a mask (photomask or reticle) 845 based on the modified IC design layout diagram 822. Mask 845 can be formed in various technologies. In some embodiments, mask 845 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 845 includes a transparent substrate (e.g., fused quartz) and an opaque material (e.g., chromium) coated in the opaque regions of the binary mask. In another example, mask 845 is formed using a phase shift technology. In a phase shift mask (PSM) version of mask 845, various features in the pattern formed on the phase shift mask are configured to have proper phase difference to enhance the resolution and imaging quality. In various examples, the phase shift mask can be attenuated PSM or alternating PSM. The mask(s) generated by mask fabrication 844 is used in a variety of processes. For example, such a mask(s) is used in an ion implantation process to form various doped regions in semiconductor wafer 853, in an etching process to form various etching regions in semiconductor wafer 853, and/or in other suitable processes.

IC fab 850 is an IC fabrication business that includes one or more manufacturing facilities for the fabrication of a variety of different IC products. In some embodiments, IC Fab 850 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 850 includes fabrication tools 852 configured to execute various manufacturing operations on semiconductor wafer 853 such that IC device 860 is fabricated in accordance with the mask(s), e.g., mask 845. In various embodiments, fabrication tools 852 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 850 uses mask(s) 845 fabricated by mask house 830 to fabricate IC device 860. Thus, IC fab 850 at least indirectly uses IC design layout diagram 822 to fabricate IC device 860. In some embodiments, semiconductor wafer 853 is fabricated by IC fab 850 using mask(s) 845 to form IC device 860. In some embodiments, the IC fabrication includes performing one or more lithographic exposures based at least indirectly on IC design layout diagram 822. Semiconductor wafer 853 includes a silicon substrate or other proper substrate having material layers formed thereon. Semiconductor wafer 853 further includes one or more of various doped regions, dielectric features, multi-level interconnects, and the like (formed at subsequent manufacturing steps).

Details regarding an integrated circuit (IC) manufacturing system (e.g., system 800 of FIG. 8), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

In one embodiment, a semiconductor device, includes a semiconductor substrate including active regions, each active region has a first long axis that extends in a first direction; a first buried metal layer below the semiconductor substrate and which a first buried conductive rail having a second long axis that extends in the first direction; a first set of buried conductive fingers that extends from the first buried conductive rail, wherein: each buried conductive finger in the first set of buried conductive fingers has a third long axis that extends in a second direction, the second direction being substantially orthogonal to the first direction; the first set of buried conductive fingers extends beneath more than one of the active regions; a second set of buried conductive fingers wherein: each buried conductive finger in the second set of buried conductive fingers has a fourth long axis that extends in the second direction; the second set of buried conductive fingers extends beneath more than one of the active regions; and the second set of buried conductive fingers are interleaved with the first set of buried conductive fingers. In some embodiments, members of the active regions are substantially parallel to one another in the first direction; and the members of the set of striped active regions are separated and substantially aligned relative to the second direction. In some embodiments, the semiconductor device further includes a contact-to-transistor-component (BVD) layer between the semiconductor substrate and the first buried metal layer wherein: the BVD layer includes a plurality of buried contacts wherein the plurality of buried contacts are provided in rows and columns that are spaced apart in a checkered pattern, wherein: the active regions are connected to corresponding ones of the buried contacts in corresponding ones of the rows of the plurality of buried contacts; each of the buried conductive fingers in the first set of buried conductive fingers and each of the buried conductive fingers in the second set of buried conductive fingers is connected to a different column of the columns of the plurality of buried contacts such that adjacent columns of the columns of the plurality of buried contacts has one of the adjacent columns connected to one of the buried conductive fingers in the first set of buried conductive fingers and another one of the adjacent columns is connected to one of the buried conductive fingers in the second set of buried conductive fingers. In some embodiments, the semiconductor device further includes a second buried metal layer that is beneath the first buried metal layer, wherein the second buried metal layer includes a third set of buried conductive fingers, wherein each buried conductive finger in the third set of buried conductive fingers is provided beneath a different one of the second set of buried conductive fingers in the first buried metal layer. In some embodiments, the semiconductor device further includes a buried via layer including a first plurality of buried vias, wherein the first plurality of buried vias are connected between the second set of buried conductive fingers and the third set of buried conductive fingers. In some embodiments, the semiconductor device further includes a buried via layer between the first buried metal layer and the second buried metal layer wherein: the first buried metal layer further includes a second buried conductive rail having a fifth long axis that extends in the first direction wherein the first set of buried conductive fingers extend from the second buried conductive rail so as to extend between the first buried conductive rail and the second buried conductive rail; the second buried metal layer includes: a first set of conductors that extend in the second direction and are provided beneath the first buried conductive rail; a second set of conductors that extend in the second direction and are provided beneath the second buried conductive rail; the buried via layer includes: a first set of buried vias that connects the first set of conductors to the first buried conductive rail; and a second set of buried vias that connects the second set of conductors to the second buried conductive rail. In some embodiments, both the first set of conductors and the second set of conductors are aligned relative to the first direction with every other one of the second set of buried conductive fingers. In some embodiments, the second set of buried conductive fingers are not connected to the first buried conductive rail and are not connected to the second buried conductive rail. In some embodiments, each of the buried conductive fingers in the first set of buried conductive fingers and each of the buried conductive fingers in the second set of buried conductive fingers extend beneath all members in the active regions. In some embodiments, the first set of conductive fingers are configured to receive a gated reference voltage. In some embodiments, the second set of conductive fingers are configured to receive an ungated reference voltage.

In some embodiments, the first buried metal layer further includes a buried conductive trace having a fifth long axis that extends in the first direction and is separated from the first buried conductive rail in the second direction wherein: both the first set of buried conductive fingers and the second set of buried conductive fingers are between the first buried conductive rail and the buried conductive trace; and the second set of buried conductive fingers extend from the buried conductive trace in the second direction; and the first set of buried conductive fingers are not connected to the buried conductive trace. In some embodiments, the first buried metal layer further includes a second buried conductive rail having a sixth long axis that extends in the first direction and wherein the buried conductive trace, the first set of buried conductive fingers and the second set of buried conductive fingers are between the first buried conductive rail and the second buried conductive rail. In some embodiments, the semiconductor device includes a second buried metal layer, wherein: the second buried metal layer includes: a third set of buried conductive fingers, wherein each buried conductive finger in the third set of buried conductive fingers has a seventh long axis that extends in the second direction; a different member of the third set of buried conductive fingers is provided beneath every other one of the second set of buried conductive fingers; the third set of buried conductive fingers are unconnected to the first buried conductive rail and the second buried conductive rail; a fourth set of buried conductive fingers that extends from the first buried conductive rail to the second buried conductive rail, wherein each buried conductive finger of the fourth set of buried conductive fingers has an eighth long axis that extends in the second direction; a different member of the fourth set of buried conductive fingers is beneath a different every other one of the second set of buried conductive fingers.

In some embodiments, the semiconductor device further includes a buried via layer between the first buried metal layer and the second buried metal layer, the buried via layer including: a first set of buried vias that connect the third set of buried conductive fingers to the every other one of the second set of buried conductive fingers beneath the third set of buried conductive fingers; a second set of buried vias that connect the fourth set of buried conductive fingers to the first buried conductive rail; and a third set of buried vias that connect the fourth set of buried conductive fingers to the second buried conductive rail.

In another embodiment, a method of manufacturing a semiconductor device, includes forming active regions, wherein each active region of the active regions has a first long axis that extends in a first direction on a semiconductor substrate; forming a first buried conductive rail having a second long axis that extends in the first direction; forming a first set of buried conductive fingers that extends from the first buried conductive rail, wherein: each buried conductive finger in the first set of buried conductive fingers has a third long axis that extends in a second direction, the second direction being substantially orthogonal to the first direction; the first set of buried conductive fingers extends beneath more than one of the set of active regions; forming a second set of buried conductive fingers wherein: each buried conductive finger in the second set of buried conductive fingers has a fourth long axis that extends in the second direction; the second set of buried conductive fingers extends beneath more than one of the set of active regions; and the second set of buried conductive fingers are interleaved with the first set of buried conductive fingers. In some embodiments, the method of, further includes forming a plurality of buried contacts in rows such that the plurality of buried contacts are spaced apart in a checkered pattern, wherein each of the active regions is connected to a different row of the rows of the plurality of buried contacts. In some embodiments, the method, further includes forming a plurality of buried contacts in columns such that the plurality of buried contacts are spaced apart in a checkered pattern, wherein each buried conductive finger in the first set of buried conductive fingers and each buried conductive finger in the second set of buried conductive fingers is connected to the buried contacts of a different column of the columns of the plurality of buried contacts such that adjacent columns of the columns of the plurality of buried contacts has the buried contact of one of the adjacent columns connected to one of the buried conductive fingers in the first set of buried conductive fingers and the buried contacts of another one of the adjacent columns is connected to one of the buried conductive fingers in the second set of buried conductive fingers.

In still another embodiment, a system for generating a layout diagram includes at least one processor; at least one non-transitory computer readable storage medium that stores computer executable code; wherein the at least one non-transitory computer readable storage medium and the computer executable program code being configured to, with the at least one processor, cause the system to generate the layout diagram including: generating active region shapes, wherein each active region shape of the active region shapes has a first long axis that extends in a first direction on a semiconductor substrate shape; generating a first buried conductive rail shape having a second long axis that extends in the first direction; generating a first set of buried conductive finger shapes that extends from the first buried conductive rail shape, wherein: each buried conductive finger shape in the first set of buried conductive finger shapes has a third long axis that extends in a second direction, the second direction being substantially orthogonal to the first direction; the first set of buried conductive finger shapes extends beneath more than one of the set of active region shapes; generating a second set of buried conductive finger shapes wherein: each buried conductive finger shape in the second set of buried conductive finger shapes has a fourth long axis that extends in the second direction; the second set of buried conductive finger shapes extends beneath more than one of the set of active region shapes; and the second set of buried conductive finger shapes are interleaved with the first set of buried conductive finger shapes. In some embodiments, the at least one non-transitory computer readable storage medium and the computer program code being configured to, with the at least one processor, cause the system to generate the layout diagram further: generate a plurality of buried contact shapes in rows and in columns such that the plurality of buried contact shapes are spaced apart in a checkered pattern, wherein: each active region shape of the stack of active region shapes is connected to a different row of the rows of the plurality of buried contact shapes by a first set of the plurality of buried contact shapes; and each buried conductive finger shape in the first set of buried conductive finger shapes and each buried conductive finger shape in the second set of buried conductive finger shapes is connected to the buried contacts of a different column of the columns of the plurality of buried contact shapes such that adjacent columns of the columns of the plurality of buried contact shapes has the buried contacts of one of the adjacent columns connected to one of the buried conductive finger shapes in the first set of buried conductive finger shapes and the buried contacts of another one of the adjacent columns is connected to one of the buried conductive finger shapes in the second set of buried conductive finger shapes.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device, comprising:
a semiconductor substrate including active regions, each active region having a long axis that extends in a first direction;
a first buried metal layer below the semiconductor substrate and which includes a first buried conductive rail having a long axis that extends in the first direction;
a first set of buried conductive fingers that extend from the first buried conductive rail, wherein:
each buried conductive finger in the first set has a long axis that extends in a second direction, the second direction being substantially orthogonal to the first direction; and
the first set of buried conductive fingers extends beneath more than one of the active regions; and
a second set of buried conductive fingers, wherein:
each buried conductive finger in the second set has a long axis that extends in the second direction;
the second set of buried conductive fingers extends beneath more than one of the active regions; and
the buried conductive fingers of the second set are interleaved with the first set of buried conductive fingers.

2. The semiconductor device of claim 1, wherein:
the active regions are substantially parallel to one another in the first direction; and
the active regions are separated relative to the second direction.

3. The semiconductor device of claim 2, further comprising:
a buried contact-to-transistor-component (BVD) layer between the semiconductor substrate and the first buried metal layer; and
wherein:
the buried BVD layer includes a plurality of buried contacts arranged in rows and columns that are spaced apart in a checkered pattern;
the active regions are connected to corresponding ones of the buried contacts in corresponding ones of the rows of the plurality of buried contacts; and
each of the buried conductive fingers in the first set and each of the buried conductive fingers in the second set is connected to the buried contacts in a different column of the columns of the plurality of buried contacts such that adjacent columns of the columns of the plurality of buried contacts has the buried contacts in one of the adjacent columns connected to one of the buried conductive fingers in the first set and the buried contacts in another one of the adjacent columns is connected to one of the buried conductive fingers in the second set.

4. The semiconductor device of claim 1, further comprising:
a second buried metal layer that is beneath the first buried metal layer and that includes:
a third set of buried conductive fingers, wherein each buried conductive finger in the third set is provided beneath a different one of the second set of buried conductive fingers in the first buried metal layer.

5. The semiconductor device of claim 4, further comprising:
a buried via layer which includes a first plurality of buried vias, wherein the first plurality of buried vias are connected between the second set of buried conductive fingers and the third set of buried conductive fingers.

6. The semiconductor device of claim 4, further comprising:
a buried via layer between the first buried metal layer and the second buried metal layer; and
wherein:
the first buried metal layer further includes a second buried conductive rail having a long axis that extends in the first direction;
the first set of buried conductive fingers extend from the second buried conductive rail so as to extend between the first buried conductive rail and the second buried conductive rail;
the second buried metal layer includes:
a first set of conductors that extend in the second direction and are provided beneath the first buried conductive rail; and
a second set of conductors that extend in the second direction and are provided beneath the second buried conductive rail; and
the buried via layer includes:
a first set of buried vias that connects the first set of conductors to the first buried conductive rail; and
a second set of buried vias that connects the second set of conductors to the second buried conductive rail.

7. The semiconductor device of claim 6, wherein:
both the first set of conductors and the second set of conductors are aligned relative to the first direction with every other one of the second set of buried conductive fingers.

8. The semiconductor device of claim 7, wherein:
the buried conductive fingers of the second set are not connected to the first buried conductive rail and are not connected to the second buried conductive rail.

9. The semiconductor device of claim 1, wherein:
each of the buried conductive fingers in the first set and each of the buried conductive fingers in the second set extend beneath all the active regions.

10. The semiconductor device of claim 9, wherein:
each of the buried conductive fingers in the first set is configured to receive an ungated reference voltage.

11. The semiconductor device of claim 9, wherein:
each of the buried conductive fingers in the second set is configured to receive a gated reference voltage.

12. The semiconductor device of claim 1, wherein:
the first buried metal layer further includes:
- a buried conductive trace having a fifth long axis that extends in the first direction and is separated from the first buried conductive rail in the second direction;

the buried conductive fingers of the first set and the buried conductive fingers of the second set are between the first buried conductive rail and the buried conductive trace;
the buried conductive fingers of the second set extend from the buried conductive trace in the second direction; and
the buried conductive fingers of the first set are not connected to the buried conductive trace.

13. The semiconductor device of claim 12, wherein:
the first buried metal layer further includes:
- a second buried conductive rail having a long axis that extends in the first direction; and the buried conductive trace, the first set of buried conductive fingers and the buried conductive fingers of the second set are between the first buried conductive rail and the second buried conductive rail.

14. The semiconductor device of claim 13, further comprising:
a second buried metal layer; and
wherein:
the second buried metal layer includes:
- a third set of buried conductive fingers, wherein each buried conductive finger in the third set has a long axis that extends in the second direction;
- a different member of the third set of buried conductive fingers is provided beneath every other one of the second set of buried conductive fingers;
- the buried conductive fingers of the third set are unconnected to the first buried conductive rail and the second buried conductive rail;
- a fourth set of buried conductive fingers that extend from the first buried conductive rail to the second buried conductive rail, wherein each buried conductive finger of the fourth set has a long axis that extends in the second direction; and
- a different member of the fourth set of buried conductive fingers is beneath a different every other one of the second set of buried conductive fingers.

15. The semiconductor device of claim 14 further comprising:
a buried via layer between the first buried metal layer and the second buried metal layer, the buried via layer including:
- a first set of buried vias that connects the third set of buried conductive fingers to the second set of buried conductive fingers;
- a second set of buried vias that connect the fourth set of buried conductive fingers to the first buried conductive rail; and
- a third set of buried vias that connect the fourth set of buried conductive fingers to the second buried conductive rail.

16. A semiconductor device, comprising:
a semiconductor substrate including active regions, each active region having a long axis that extends in a first direction;
a first buried metal layer below the semiconductor substrate and which includes a first buried conductive rail having a long axis that extends in the first direction;
a first set of buried conductive fingers that extend from the first buried conductive rail,
each buried conductive finger in the first set having a long axis that extends in a second direction, the second direction being substantially orthogonal to the first direction, each of the buried conductive fingers in the first set extending beneath all the active regions; and
the first set of buried conductive fingers extending beneath more than one of the active regions; and
a second set of buried conductive fingers, wherein:
each buried conductive finger in the second set having a long axis that extends in the second direction, each of the buried conductive fingers in the second set extending beneath all the active regions; and
the buried conductive fingers of the second set being interleaved with the first set of buried conductive fingers.

17. The semiconductor device of claim 16, wherein each of the buried conductive fingers in the first set is configured to receive an ungated reference voltage.

18. The semiconductor device of claim 16, wherein each of the buried conductive fingers in the second set is configured to receive a gated reference voltage.

19. A semiconductor device, comprising:
a semiconductor substrate including active regions, each active region having a long axis that extends in a first direction;
a first buried metal layer below the semiconductor substrate and which includes a first buried conductive rail having a long axis that extends in the first direction;
a first set of buried conductive fingers in the first buried metal layer that extend from the first buried conductive rail,
each buried conductive finger in the first set having a long axis that extends in a second direction, the second direction being substantially orthogonal to the first direction; and
each buried conductive finger in the first set extending beneath more than one of the active regions, and
a second set of buried conductive fingers in the first buried metal layer,
each buried conductive finger in the second set having a long axis that extends in the second direction, and
each buried conductive finger in the second set extending beneath more than one of the active regions;
the buried conductive fingers of the second set being interleaved with the first set of buried conductive fingers;
a second buried metal layer below the first buried metal layer; and
a third set of buried conductive fingers, in the second buried metal layer,
each buried conductive finger in the third set having a long axis that extends in the second direction.

20. The semiconductor device of claim 19, wherein:
each buried conductive finger in the third set is provided beneath a different one of the second set of buried conductive fingers.

* * * * *